(12) United States Patent
Ling et al.

(10) Patent No.: US 12,539,515 B2
(45) Date of Patent: Feb. 3, 2026

(54) DEVICES FOR CELL SEPARATION

(71) Applicant: SOUTHWEST RESEARCH INSTITUTE, San Antonio, TX (US)

(72) Inventors: Jian Ling, Spring Branch, TX (US); Stephen T. Wellinghoff, San Antonio, TX (US); Carlos Martín Cantú, San Antonio, TX (US); Angelica Fernandez, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 618 days.

(21) Appl. No.: 18/050,095

(22) Filed: Oct. 27, 2022

(65) Prior Publication Data

US 2023/0139619 A1 May 4, 2023

Related U.S. Application Data

(60) Provisional application No. 63/263,161, filed on Oct. 28, 2021.

(51) Int. Cl.
*B01L 3/00* (2006.01)

(52) U.S. Cl.
CPC . *B01L 3/502761* (2013.01); *B01L 2200/0652* (2013.01); *B01L 2300/0681* (2013.01)

(58) Field of Classification Search
CPC ....... B01L 3/502761; B01L 2200/0652; B01L 2300/0681; B01L 2300/0636; B01L 2300/0832; B01D 2239/0421; B01D 2239/0428; B01D 2239/0478; B01D 2239/1216; B01D 15/3804; B01D 39/1676; C12M 47/04

See application file for complete search history.

(56) References Cited

U.S. PATENT DOCUMENTS

| | | | |
|---|---|---|---|
| 4,247,434 A | 1/1981 | Vanderhoff et al. |
| 5,360,609 A | 11/1994 | Wellinghoff |
| 5,443,950 A | 8/1995 | Naughton et al. |
| 5,631,300 A | 5/1997 | Wellinghoff |
| 5,639,295 A | 6/1997 | Wellinghoff et al. |
| 5,650,446 A | 7/1997 | Wellinghoff et al. |
| 5,668,185 A | 9/1997 | Wellinghoff et al. |

(Continued)

FOREIGN PATENT DOCUMENTS

| | | |
|---|---|---|
| CA | 2882108 | 3/2014 |
| CA | 3023221 | 11/2019 |

(Continued)

OTHER PUBLICATIONS

Office Action from related Korean Appln. No. 10-2021-7011941, dated Oct. 26, 2023. English translation attached.

(Continued)

*Primary Examiner* — Brian J. Sines
(74) *Attorney, Agent, or Firm* — Grossman, Tucker, Perreault & Pfleger, PLLC

(57) ABSTRACT

Devices and methods suitable for cell separation. The devices herein include non-random voids interconnected through non-random pores and/or non-random solid geometrical structures optionally connected through solid non-random interconnecting elements. Such devices are preferably suitable for affinity-based cell isolation techniques which rely upon binding interactions.

10 Claims, 22 Drawing Sheets

(56) References Cited

U.S. PATENT DOCUMENTS

| | | |
|---|---|---|
| 5,695,814 A | 12/1997 | Wellinghoff et al. |
| 5,705,092 A | 1/1998 | Wellinghoff et al. |
| 5,707,739 A | 1/1998 | Wellinghoff et al. |
| 5,888,528 A | 3/1999 | Wellinghoff et al. |
| 5,914,120 A | 6/1999 | Wellinghoff et al. |
| 5,922,776 A | 7/1999 | Wellinghoff et al. |
| 6,046,243 A | 4/2000 | Wellinghoff et al. |
| 6,277,408 B1 | 8/2001 | Wellinghoff et al. |
| 6,605,304 B1 | 8/2003 | Wellinghoff et al. |
| 6,949,355 B2 | 9/2005 | Yamanishi et al. |
| 7,041,234 B2 | 5/2006 | Wellinghoff et al. |
| 7,094,360 B2 | 8/2006 | Wellinghoff et al. |
| 7,098,359 B2 | 8/2006 | Wellinghoff et al. |
| 7,108,801 B2 | 9/2006 | Wellinghoff et al. |
| 7,147,800 B2 | 12/2006 | Wellinghoff et al. |
| 7,238,831 B2 | 7/2007 | Wellinghoff et al. |
| 7,273,567 B1 | 9/2007 | Wellinghoff et al. |
| 7,678,572 B2 | 3/2010 | Har-Noy |
| 7,956,164 B2 | 6/2011 | Har-Noy |
| 8,007,823 B2 | 8/2011 | Favis et al. |
| 8,012,750 B2 | 9/2011 | Har-Noy |
| 8,114,289 B2 | 2/2012 | Zheng et al. |
| 8,173,413 B2 | 5/2012 | Chiu et al. |
| 8,399,047 B2 | 3/2013 | Lahann et al. |
| 8,463,418 B2 | 6/2013 | Liu et al. |
| 8,900,610 B2 | 12/2014 | Wellinghoff |
| 8,961,892 B2 | 2/2015 | Hutter et al. |
| 8,999,167 B2 | 4/2015 | Nakano et al. |
| 9,364,579 B2 | 6/2016 | Wellinghoff |
| 9,410,114 B2 | 8/2016 | Wilson et al. |
| 9,456,893 B2 | 10/2016 | Ling |
| 9,512,393 B2 | 12/2016 | Kasuto et al. |
| 9,593,308 B2 | 3/2017 | Har-Noy |
| 9,663,763 B2 | 5/2017 | Sentman |
| 10,052,372 B2 | 8/2018 | Wang et al. |
| 10,131,876 B2 | 11/2018 | Kaiser et al. |
| 10,179,151 B2 | 1/2019 | Ferber |
| 10,450,574 B2 | 10/2019 | Johnson et al. |
| 10,577,585 B2 | 3/2020 | Nguyen et al. |
| 10,988,724 B2 | 4/2021 | Ling et al. |
| 11,149,244 B2 | 10/2021 | Ling |
| 11,447,731 B2 | 9/2022 | Ling et al. |
| 11,492,580 B2 | 11/2022 | Ling et al. |
| 2002/0164825 A1* | 11/2002 | Chen .............. G01N 33/574 436/526 |
| 2003/0119185 A1 | 6/2003 | Berenson et al. |
| 2004/0062809 A1 | 4/2004 | Honiger et al. |
| 2005/0038492 A1 | 2/2005 | Mason et al. |
| 2005/0238683 A1 | 10/2005 | Adhikari et al. |
| 2006/0121005 A1 | 6/2006 | Berenson et al. |
| 2007/0037172 A1* | 2/2007 | Chiu .............. G01N 1/34 435/6.12 |
| 2007/0178586 A1 | 8/2007 | Yang et al. |
| 2008/0194010 A1 | 8/2008 | Liu |
| 2008/0248572 A1 | 10/2008 | Antwiler |
| 2009/0041825 A1 | 2/2009 | Kotov et al. |
| 2010/0081121 A1 | 4/2010 | Axen et al. |
| 2010/0273667 A1 | 10/2010 | Kotov et al. |
| 2011/0003380 A1 | 1/2011 | Miltenyi et al. |
| 2012/0009159 A1 | 1/2012 | Humayun et al. |
| 2012/0058560 A1 | 3/2012 | Derichs et al. |
| 2012/0208265 A1 | 8/2012 | Partsch et al. |
| 2013/0030548 A1 | 1/2013 | Ling |
| 2013/0084622 A1 | 4/2013 | Ram et al. |
| 2013/0131423 A1 | 5/2013 | Wang et al. |
| 2013/0344229 A1 | 12/2013 | Messersmith et al. |
| 2014/0199679 A1 | 7/2014 | Panoskaltsis et al. |
| 2015/0087057 A1 | 3/2015 | Zink et al. |
| 2015/0140333 A1 | 5/2015 | Niu |
| 2016/0200891 A1 | 7/2016 | Virgilio et al. |
| 2017/0028042 A1 | 2/2017 | Wang et al. |
| 2017/0051309 A1 | 2/2017 | Lesch et al. |
| 2017/0081638 A1 | 3/2017 | Ma |
| 2017/0312392 A1 | 11/2017 | Guilak et al. |
| 2017/0321178 A1 | 11/2017 | Ling et al. |
| 2018/0016533 A1 | 1/2018 | Tai et al. |
| 2018/0057784 A1 | 3/2018 | Wang et al. |
| 2018/0142200 A1 | 5/2018 | Mason et al. |
| 2019/0002815 A1 | 1/2019 | Wang et al. |
| 2019/0032011 A1 | 1/2019 | Better et al. |
| 2019/0169572 A1 | 6/2019 | Shi et al. |
| 2019/0211292 A1 | 7/2019 | Beauchesne et al. |
| 2019/0269768 A1 | 9/2019 | Wang et al. |
| 2019/0276846 A1 | 9/2019 | Lipponen et al. |
| 2019/0292517 A1 | 9/2019 | Cheung et al. |
| 2019/0309250 A1 | 10/2019 | Ling |
| 2020/0071670 A1 | 3/2020 | Shi et al. |
| 2020/0172864 A1 | 6/2020 | Chiang et al. |
| 2020/0181562 A1 | 6/2020 | Mcafee et al. |
| 2020/0190457 A1 | 6/2020 | Veraitch et al. |
| 2020/0208121 A1 | 7/2020 | Hewitt et al. |
| 2020/0248121 A1 | 8/2020 | Ferrie et al. |
| 2020/0248122 A1 | 8/2020 | Ferrie et al. |
| 2020/0248123 A1 | 8/2020 | Ferrie et al. |
| 2020/0248124 A1 | 8/2020 | Ferrie et al. |
| 2020/0255783 A1 | 8/2020 | Ferrie et al. |
| 2020/0255790 A1 | 8/2020 | Veraitch et al. |
| 2020/0255793 A1 | 8/2020 | Oconnor et al. |
| 2020/0283712 A1 | 9/2020 | Wang et al. |
| 2021/0317396 A1 | 10/2021 | Ling |
| 2021/0355420 A1* | 11/2021 | Ling .............. C12M 25/14 |

FOREIGN PATENT DOCUMENTS

| | | |
|---|---|---|
| CN | 102428168 | 4/2012 |
| CN | 103328625 | 9/2013 |
| CN | 105126168 | 12/2015 |
| EP | 3351656 | 7/2018 |
| EP | 3447120 | 2/2019 |
| JP | 2005503156 | 2/2005 |
| JP | 2007-500015 | 1/2007 |
| JP | 2010-523118 | 7/2010 |
| JP | 2019-500030 | 1/2019 |
| JP | 2010517590 | 5/2020 |
| KR | 102013134080 | 12/2013 |
| WO | 64/03496 | 2/1994 |
| WO | 98/050522 | 11/1998 |
| WO | 2004087797 | 10/2004 |
| WO | 2008101001 | 8/2008 |
| WO | 2008140295 | 11/2008 |
| WO | 2011072393 | 6/2011 |
| WO | 2012168295 | 12/2012 |
| WO | 2014037862 | 3/2014 |
| WO | 2015001321 | 1/2015 |
| WO | 2015024133 | 2/2015 |
| WO | 2015086029 | 6/2015 |
| WO | 2017049066 | 3/2017 |
| WO | 2017099712 | 6/2017 |
| WO | 2017/180724 | 10/2017 |
| WO | 2017192717 | 11/2017 |
| WO | 2017204235 | 11/2017 |
| WO | 2018005521 | 1/2018 |
| WO | 2018013797 | 1/2018 |
| WO | 2019/104069 | 5/2019 |
| WO | 2019194842 | 10/2019 |
| WO | 2020068840 | 4/2020 |

OTHER PUBLICATIONS

Office Action from related Australian Appln. No. 2021253701, dated Oct. 19, 2023.

Office Action from related Chinese Appln. No. 201880093563.6, dated Sep. 16, 2023. English translation attached.

Office Action from related Chinese Appln. No. 201980071515.1, dated Nov. 27, 2023. English translation attached.

Extended European Search Report from related EP Appln. No. 22873908.2, dated Jul. 15, 2025.

Chun et al., "Patchwise bone microstructure reconstruction", The 2021 World Congress on Advances in Structural Engineering and Mechanics, S. Korea, 2021, pp. 1-5.

Guha et al., Deep learning based high-resolution reconstruction of trabecular bone microstructures from low-resolution CT scans using GAN-Circle, Proceedings of SPIE, vol. 11317, 2020, U.S., pp. 1-12.

(56) References Cited

OTHER PUBLICATIONS

Xie et al., "Super-Resolution reconstruction of Bone Micro-Structure Micro-CT Image based on Auto-Encoder Structure", Proceedings of the IEEE International Conference on Robotics and Biomimetics, China, 2019, pp. 1568-1575.
MAS.865 2018 "How to Make Something that Makes (almost) Anything"; <<http://fab.cba.mit.edu/classes/865.18/additive/multiphoton-polymerization/index.html>> (accessed Mar. 30, 2020; 10 pgs).
Geng et al; "Ultrafast Multi-focus 3-D Nano-fabrication Based on Two-photon Polymerization" <<https://www.nature.com/articles/s41467-019-10249-2>> (accessed Mar. 30, 2020; 7 pgs).
"Think Big. Print Nano. Your Partner for High-precision Additive Manufacturing" <<https://www.nanoscribe.com/en/>> (accessed Mar. 30, 2020; 7 pgs).
"Wide Range of Applications in Research, Prototyping and Production Processes Nanoscribe " <<https://www.nanoscribe.com/en/applications>> (accessed Mar. 30, 2020; 11 pgs).
Petrie Aronin et al: "Comparative Effects of Scaffold Pore Size, Pore Volume, and Total Void Volume on Cranial Bone Healing Patterns Using Microsphere-based Scaffolds" Journal of Biomedical Materials Research Part A, Wiley InterScience Periodicals, Inc. published online Apr. 28, 2008 pp. 632-641.
Zeltinger et al: "Effect of Pore Size and Void Fraction on Cellular Adhesion, Proliferation, and Matrix Deposition"; Tissue Engineering, vol. 7, No. 5, 2001, Mary Ann Liebert, Inc.; downloaded by EPO from <<www.lieberpub.com>> on Nov. 22, 2019 (pp. 557-572).
Extended European Search Report from related European Patent Appln No. 17793249.8, dated Dec. 5, 2019.
1st Written Opinion issued in related Singaporean Appln No. 11201809805W, dated Feb. 3, 2020.
International Search Report from related Appln. No. PCT/US2019/052713, dated Jan. 23, 2020.
Preliminary Report on Patentability mailed Nov. 15, 2018, issued in PCT Patent Application No. PCT/US2017/030833, 12 pages.
Office Action mailed Jan. 23, 2019, issued in U.S. Appl. No. 15/585,812, 11 pages.
Office Action mailed Oct. 29, 2019, issued in U.S. Appl. No. 15/585,812, 12 pages.
Office Action mailed Aug. 7, 2020, issued in U.S. Appl. No. 15/945,000, 14 pages.
Office Action mailed Sep. 28, 2020, issued in U.S. Appl. No. 15/585,812, 7 pages.
Käpylä et al., Direct laser writing and geometrical analysis of scaffolds with designed pore architecture for three-dimensional cell culturing, Journal of Micromechanics and Microengineering, 22, 2012, 13 pages.
Looby et al., Fixed bed porous glass sphere (porosphere) bioreactors for animal cells, Cytotechnology 1, Aug. 8, 1988, 339-346.
Ma et al., Biodegradable Polymer Scaffolds with Well0Defined Interconnected Spherical Pore Network, Tissue Engineering, vol. 7, No. 1, 2001, 17 pages.
Ma et al., Paraffin Spheres as Porogen to Fabricate Poly(L-Lactic Acid) Scaffolds with Improved Cytocompatibility for Cartilage Tissue Engineering, Department of Polymer Science and Engineering, Zhejiang University, Hangzhou China, Wiley Periodicals, Inc., 2003, 8 pages.
Malinauskas et al., 3D Microporous Scaffolds Manufactured via Combination of Fused Filament Fabrication and Direct Laser Writing Ablation, Micromachines, 5, 2014, 20 pages.
First Intent to Grant mailed Oct. 13, 2020, issued in European Patent Application No. 17793249.8, 7 pages.
Preliminary Report on Patentability mailed Oct. 15, 2020, issued in PCT Patent Application No. PCT/US2018/031027, 7 pages.
Choi et al., "Neovascularization in Biodegradable Inverse Opal Scaffolds with Uniform and Precisely Controlled Pore Sizes", NIH Public Access—Adv Health Mater, Jan. 2013: 2(1), pp. 145-154.
Office Action from related Japanese Patent Application No. 2018-558237, dated Jan. 18, 2021, English translation attached.

Office Action from related Indian Patent Application No. 201817044901, dated Feb. 16, 2021.
Second Intent to Grant from related European Patent Application No. 17793249.8, dated Feb. 2, 2021.
Notice of Allowance from related U.S. Appl. No. 15/585,812, dated Jan. 13, 2021.
Corrected Notice of Allowability from related U.S. Appl. No. 15/585,812, dated Mar. 26, 2021.
Office Action from related Korean Application No. 10-2018-7035015, mailed Aug. 30, 2021.
Office Action from related Chinese Application No., 201780036683.8, mailed Sep. 27, 2021.
International Search Report and Written Opinion from related PCT Appln. No. PCT/US2021/070371, dated Jul. 23, 2021.
First Office Action from related Australian Appln. No. 2017261267, mailed Jan. 17, 2022.
Supplemental Partial European Search Report from related Application No. 19866434.4, mailed Jun. 9, 2022.
Office Action from related Singaporean Appln. No. 11202009803T, dated May 24, 2022.
Office Action from related Japanese Appln. No. 2020-554460, dated Apr. 11, 2022. English translation attached.
Office Action from related Indian Appln. No. 202017046644, dated Sep. 7, 2022. English translation attached.
Office Action from related Korean Appln. No. 10-2020-7031766, dated Jul. 11, 2022. English translation attached.
Extended European Search Report from related Application No. 19866434.4, mailed Sep. 9, 2022.
Office Action from related Japanese Appln. No. 2021-516622, dated Oct. 11, 2022. English translation attached.
Office Action from related Singaporean Appln. No. 11202102986X, dated Oct. 21, 2022.
First Office Action from corresponding U.S. Appl. No. 15/945,000, dated Jun. 3, 2021.
Office Action from corresponding U.S. Appl. No. 16/580,956, dated Jan. 21, 2022.
Notice of Allowance from related U.S. Appl. No. 16/580,956, dated May 12, 2022.
Allied Market Research, "Gene Therapy Market—Global Opportunity Analysis and Industry Forecast, 2017-2023", https://www.reportlinker.com/p05371879/Gene-Therapy-Market-Global-Opportunity-Analysis-and-Industry-Forecast. html, Feb. 2018.
Allied Market Research, "Gene Therapy Market by Vector Type (Viral Vector and Non-Viral Vector), Gene Type (Antigen, Cytokine, Tumor Suppressor, Suicide, Deficiency, Growth Factors, Receptors and Others), and Application (Oncological Disorders, Rare Diseases, Cardiovascular Diseases, Neurological Disorders, Infectious Disease and Other Diseases), Global Opportunity Analysis and Industry Forecast, 2019-2026", https://www.alliedmarketresearch.com/gene-therapy-market, Apr. 2022.
Manceur, et al., "Scalable Lentiviral Vector Production Using Stable HEK293SF Producer Cell Lines", Human Gene Therapy Methods, vol. 28, No. 6, 2017, pp. 330-339.
Rout-Pitt, et al., "Large-Scale Production of Lentiviral Vectors using Multilayer Cell Factories", Journal of Biological Methods, 2018, vol. 5(2), pp. 1-9.
Valkama, et al., "Optimization of Lentiviral Vector Production for Scale-up in Fixed-bed Bioreactor", Gene Therapy 2018, 25, pp. 39-46.
Extended European Search Report from related EP Appln. No. 21785732.5, dated Mar. 17, 2025.
Office Action from related Japanese Appln. No. 2022-561146, dated Feb. 25, 2025. English translation attached.
International Search Report and Written Opinion from corresponding PCT Appln. No. PCT/US2022/078750, dated Jan. 31, 2023.
Alves da Silva, M., et al, "Chondrogenic Differentiation of Human Bone Marrow Mesenchymal Stem Cells in Chitosan-Based Scaffolds Using a Flow-perfusion Bioreactor"; Journal of Tissue Engineering and Regenerative Medicine; 2011, 5(9), pp. 722-732.
Arifin, M., et al.: "Ultraviolet/Ozone (UV/O3) Treated Polystyrene (PS) Microcarriers for Animal Cell Culture"; Journal of Chemical Technology & Biotechnology 2016, 91(10): pp. 2607-2619.

(56) References Cited

OTHER PUBLICATIONS

Boland, E., et al; "In Vitro Cytotoxicity of a Low-shrinkage Polymerizable Liquid Crystal Resin Monomer"; Journal of Biomedical Materials Research Part B, Applied Biomaterials 2006, 79(1): pp. 1-6.
Caicedo-Carvajal, C.E.; 3D Perfusion Bioreactor: The Cumulative Advantages of 3D Scaffold Geometry and Perfusion for Scale-up Processes: 3D Biotek; Technology Center of NJ <<http://www.3DBiotek.com>> accessed Jun. 12, 2019.
Chen, G., et al "Scaffold Design for Tissue Engineering"; Macromolecular Bioscience, 2002, 2, pp. 67-77.
Cheung, A., et al; "Scaffolds That Mimic Antigen-Presenting Cells Enable Ex Vivo Expansion of Primary T Cells"; Nature Biotechnology vol. 36, No. 2, Feb. 2018.
Choi, S., et al; "Alzheimer's Disease and Stem Cell Therapy"; Experimental Neurobiology 2014, vol. 23(1), pp. 45-52.
Dynabeads™ Human T-Activator CD3/CD28 for T Cell Expansion and Activation <<https://www.thermofisher.com/order/catalog/product/11161D>> accessed Aug. 30, 2018.
Elkasabi, Y., et al; "Towards Multipotent Coatings: Chemical Vapor Deposition and Biofunctionalization of Carbonyl-Substituted Copolymers"; Macromolecular Rapid Communications 2008, 29(11): pp. 855-870.
Frith, J., et al; "Dynamic Three-Dimensional Culture Methods Enhance Mesenchymal Stem Cell Properties and Increase Therapeutic Potential"; Tissue Engineering Part C, Methods 2010, vol. 16(4): 735-749.
Gardel, L., et al; "A Novel Bidirectional Continuous Perfusion Bioreactor for the Culture of Large-sized Bone Tissue-engineered Constructs"; Society for Biomaterials, Journal of Biomedical Materials Research B: Applied Biomaterials; Nov. 2013, vol. 10 1B, Issue 8, pp. 1377-1386.
General Electric Wave Bioreactor Systems, Cell Culture Procedures <<www.gelifesciences.com/wave>> accessed Apr. 18, 2017.
Glavaski-Joksimovic, A., et al; "Mesenchymal Stem Cells and Neuroregeneration in Parkinson's Disease", Experimental Neurology 2013, vol. 247, pp. 25-38.
Gordon, G., et al; "The Chemistry of Chlorine Dioxide"; Progress in Inorganic Chemistry 1972, vol. 15: pp. 201-286.
Han, Y, et al; "High-Performance Nano-Photoinitiators with Improved Safety for 3D Printing"; ACS Applied Materials and Interfaces 2017, 9(38): pp. 32418-32423.
Higuera, G., et al; "The Physics of Tissue Formation with Mesenchymal Stem Cells"; Trends in Biotechnology, Nov. 2012, vol. 30, No. 11; pp. 583-590.
Kaiser, A., et al; "Towards a Commercial Process For the Manufacture of Genetically Modified T Cells For Therapy"; https://www.nature.com/articles accessed Mar. 26, 2018.
Kim, J., et al; "Bioreactor Strategy in Bone Tissue Engineering: Pre-Culture and Osteogenic Differentiation Under Two Flow Configurations"; Tissue Engineering: Part A 2012, vol. 18, Nos. 21-22: pp. 2354-2364.
Ko, H, et al; "One Step Immobilization of Peptides and Proteins by Using Modified Parylene with Formyl Groups"; Biosensors and Bioelectronics 2011, 30(1): pp. 56-60.
Kumar, A, et al; "Human Mesenchymal Stem Cells Expansion on Three-Dimensional (3D) Printed Poly-Styrene (PS) Scaffolds in a Perfusion Bioreactor"; Science Direct 2017, vol. 65, pp. 115-120.
Kumar, A., et al "Large Scale Industrialized Cell Expansion Producing the Critical Raw Material for Biofabrication Processes"; Biofabrication 7(4): 044103 (2015).
Kwon, T., et al; "Microfluidic Cell Retention Device for Perfusion of Mammalian Suspension Culture"; Scientific Reports 7:6703, 2017; <<https://www.nature.com/articles/s41598-017-06949-8>> accessed Mar. 26, 2018.
Lechanteur, C., et al "Large-Scale Clinical Expansion of Mesenchymal Stem Cells in the GMP-Compliant, Closed Automated Quantum® Cell Expansion System: Comparison with Expansion in Traditional T-Flasks"; Journal of Stem Cell Research & Therapy 2014, 04(08).

Ligon, S. et al; "Polymers for 3D Printing and Customized Additive Manufacturing", Chemical Reviews 2017, 117(15): pp. 10212-10290.
Mirro, R., "An Update on the Advantages of Fibra-Cel® Disks for Cell Culture"; eppendorf, Application Note No. 313, Jul. 2011.
Papadimitropoulos, A., et al; "Expansion of Human Mesenchymal Stromal Cells From Fresh Bone Marrow in a 3D Scaffold-Based System Under Direct Perfusion"; PLOS One, Jul. 2014, vol. 9, Issue 7.
Portner, R., et al; "Fixed Bed Reactors for the Cultivation of Mammalian Cells: Design, Performance and Scale-Up"; The Open Biotechnology Journal, 2007, 1, 41-46.
Provin, C., et al "A Method for the Design of 3D Scaffolds for High-Density Cell Attachment and Determination of Optimum Perfusion Culture Conditions"; Journal of Biomechanics 41 (2008) 1436-1449.
Sailon, A., et al "A Novel Flow-Perfusion Bioreactor Supports 3D Dynamic Cell Culture"; Journal of Biomedicine and Biotechnology, vol. 2009, Article ID 873816.
Schop, D., et al "Expansion of Mesenchymal Stem Cells Using a Microcarrier-based Cultivation System: Growth and Metabolism"; Journal of Tissue Engineering and Regenerative Medicine; 2008, 2L 126-135.
Sobral, JM et al "Three-Dimensional Plotted Scaffolds With Controlled Pore Size Gradients: Effect of Scaffold Geometry on Mechanical Performance and Cell Seeding Efficiency" Acta Biomaterialia, vol. 7, Issue 3, Mar. 2011, pp. 1009-1018 cited as Y PCT/US17/30833 in the ISR & WO, date of mailing Aug. 2, 2017 (10 pgs).
Specialty Coating Systems Parylene Properties <<https://scscoatings.com/docs/brochures/parylene_properties.pdf>> accessed Aug. 30, 2018.
Tan, C., et al; "Surface Engineering and Patterning Using Parylene for Biological Applications"; Materials 2010, 3(3): pp. 1803-1832.
Van Den Driesche, S., et al; "3D Printing Solutions for Microfluidic Chip-to-World Connections"; Micromachines 2018, 9: 71 (12 pgs).
Mtale, A., et al; "Frontal Conversion and Uniformity in 3D Printing by Photopolymerisation", . Materials 2016, 9(760), 13 pgs.
Weber, C. et al (2010) Production Process for Stem Cell Based Therapeutic Implants: Expanson of the Production Cell Line and Cultivation of Encapsulated Cells. Retrieved from http://krex.ksu.edu.
Wellinghoff, S., et al; Advanced Dental Restorative Composites Utilizing Low Polymerization Shrinkage Liquid Crystalline Monomers. In: Physical Chemistry 2006. Belgrade, Serbia; 2006, (8 pgs).
Wen, Z., et al "Repair Mechanisms of Bone Marrow Mesenchymal Stem Cells in Myocardial Infarction". Journal of Cellular and Molecular Medicine 2011, vol. 15, No. 5, pp. 1032-1043.
Whitford, W., et al "Single-Use, Continuous Processing of Primary Stem Cells"; BioProcess International, Cell Therapy Processing; Mar. 2014, 12(3):26-33.
Wu, H., et al; "Mesenchymal Stem Cell-based Therapy for Type 1 Diabetes"; Discovery Medicine 2014, vol. 17(93); pp. 139-143.
Yamada, S., et al; "Multi-Sized Sphere Packing"; <<http://www2.latech.edu/-jkanno/packing.pdf>>; dated Jul. 4, 2009; pp. 7-8 cl20; cited as Y in the ISR & WO, date of mailing Aug. 2, 2017; of related application No. PCT/US17/30833.
Yang, S., et al: "Mussel-Inspired Encapsulation and Functionalization of Individual Yeast Cells"; Journal of the American Chemical Society, 133, 2795-2797, 2011.
Yeatts, A., et al; "Bioreactors to Influence Stem Cell Fate: Augmentation of Mesenchymal Stem Cell Signaling Pathways Via Dynamic Culture Systems"; Biochimica et Biophysica Acta 2013, 1830 (2); pp. 2470-2480.
Yourek, G, et al; "Shear Stress Induces Osteogenic Differentiation of Human Mesenchymal Stem Cells"; Regenerative Medicine 2010, vol. 5, No. 5; pp. 713-724.
Zhang, J., et al; "Fabrication of Three Dimensional Polymeric Scaffolds With Spherical Pores"; J. Mater Sci 41 (2006) pp. 1725-1731 cited as A in PCT/US18/31027 ISR/WO mailed Jul. 23, 2018.
ISR & Written Opinion issued in related Application No. PCT/US2017/30833, dated Aug. 2, 2017.
ISR & Written Opinion issued in related Application No. PCT/US18/31027, dated Jul. 23, 2018.

(56) References Cited

OTHER PUBLICATIONS

Choi, et al "Three-Dimensional Scaffolds for Tissue Engineering: The Importance of Uniformity in Pore Size and Structure" American Chemical Society, Langmuir Article published on Web Nov. 23, 2010, 26(24), pp. 19001-19006.
Lee, et al: "Three-Dimensional Cell Culture Matrices: State of the Art"; Tissue Engineering: Part B, vol. 14, No. 1, 2008, pp. 61-86.

\* cited by examiner

DEVICES FOR CELL SEPARATION

GOVERNMENT SUPPORT

This invention was made with Government support under contract 75F40119C10158 awarded by the Food & Drug Administration. The Government has certain rights in the invention.

FIELD

The present invention relates to devices and methods suitable for cell separation. The devices herein include non-random voids interconnected through non-random pores and/or non-random solid geometrical structures optionally connected through solid non-random interconnecting elements. Such devices are preferably suitable for affinity-based cell isolation techniques which rely upon binding interactions.

BACKGROUND

Cell purification remains an important tool to improve on the separation of cells for therapeutic, diagnostic and research purposes. Cell purification methods have utilized non-affinity methods that rely on the physio-chemical properties of cells such as their size, shape, and density. Techniques that rely upon non-affinity methods include density gradient centrifugation, dielectrophoresis, sonication, and filtration. Affinity methods, which focus on binding interactions, can include chromatography, fluorescence activated cell sorting (FACS) and magnetic-activated cell sorting (MACS).

Accordingly, there remains a continuing focus on the development of new devices and methods for improving cell isolation that would, e.g., offer relatively large and controlled surface-volume ratios and optimized geometric and spatial properties that can be optimized for a given cell purification protocol.

SUMMARY

A method to separate one or more targeted cells from a plurality of cells comprising:
(a) supplying a device comprising biocompatible polymer material having a plurality of voids having a diameter D and a plurality of pore openings between said voids having a diameter d, including a surface area for cell separation, wherein 90% or more of said voids have a selected void volume (V) that does not vary by more than +/−10.0% and 90% or more of said pore openings between said voids have a value of d that does not vary by more than +/−10.0%;
(b) providing a surface coating on said voids wherein said surface coating provides for cell binding;
(c) passing a plurality of cells in a fluid through said device to provide a fluid output; and
 (1) capturing one or more selected cells from said plurality of cells on the coated surface of said device; or
 (2) capturing the one or more selected cells from the plurality of cells in said fluid output.

A method to separate one or more targeted cells from a plurality of cells comprising:
(a) supplying a device comprising biocompatible polymer material having a plurality of solid geometrical structures wherein 90% or more of said geometrical structures have a volume (V) that does not vary by more than +/−10.0%;
(b) providing a surface coating on said outer surface of the geometrical structures wherein said surface coating provides for cell binding;
(c) passing a plurality of cells in a fluid through said device to provide a fluid output; and
 (1) capturing one or more selected cells from said plurality of cells on the coated surface of said device; or
 (2) capturing the one or more selected cells from the plurality of cells in said fluid output.

A device for cell separation comprising solid geometrical structures have outer surfaces wherein 90% or more of said solid geometrical structures have a volume (V) that does not vary by more than +\−10.0%, including a surface coating on said outer surfaces wherein said surface coating provides for cell binding; a plurality of solid interconnecting elements between said solid geometrical structures wherein 90% or more of said solid interconnecting elements define a volume that does not vary by more than +\−10.0%; and an inlet and outlet to allow for inflow and outflow of a fluid containing cells for separation.

DETAILED DESCRIPTION OF THE DRAWINGS

Figure 1A:
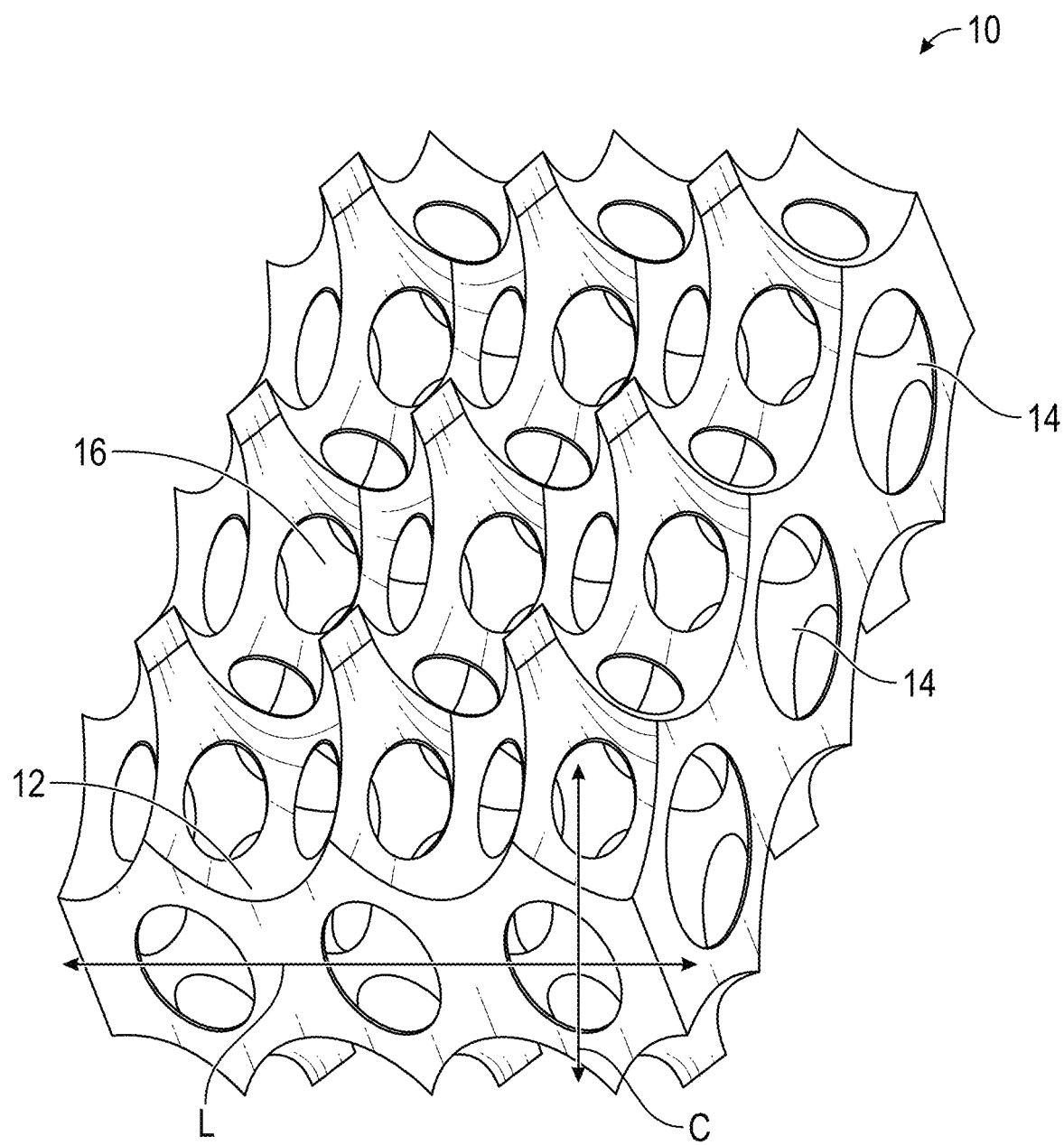
FIG. 1A illustrates a sectional view of a first cell separation device of a first configuration herein containing non-random voids and non-random openings or pores.

FIG. 1A illustrates a sectional view of a first cell separation device 10 herein containing non-random voids 14 and non-random openings or pores 16. Reference to cell separation may be understood to include cell isolation and/or cell purification and/or cell enrichment. More specifically, the first device includes an interconnected 3D surface area 12 with non-random voids 14 which are preferably of spherical shape and preferably have internal concave surfaces to maximize the surface-to-volume ratio. A void is understood as an open space with some identified volume. By reference to non-random it should be understood that one can identify a targeted or selected number of voids and selected number of pores in the device that results in a repeating void size or pore size of a desired tolerance.

Accordingly, the device 10 includes non-random interconnecting pore openings 16 as between the non-random voids. Again, reference to non-random should be understood that one can now identify a targeted or selected number of pores for the voids, of a selected pore diameter, that results in an actual number of pores having pore diameters of a desired tolerance. The device as illustrated in cut-away view also ultimately defines a layer of non-random voids (see arrow "L") and it may be appreciated that the multiple layers of the device may then allow for identification of a plurality of such non-random voids within a column (see arrow "C").

Figure 1B:
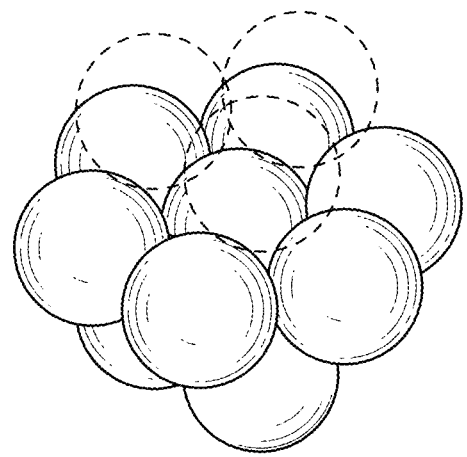
FIG. 1B illustrates a unit negative model of the cell separation device of the first configuration that shows the overlapping of neighborhood spheres.
Figure 1C:
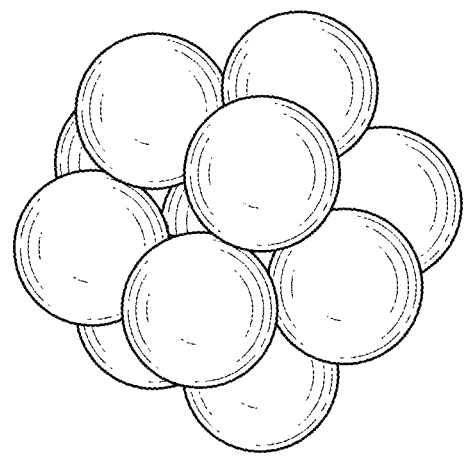
FIG. 1C illustrates a unit negative model with each sphere (defining a void region) surrounded by 12 identical neighborhood spheres.
Figure 1D:
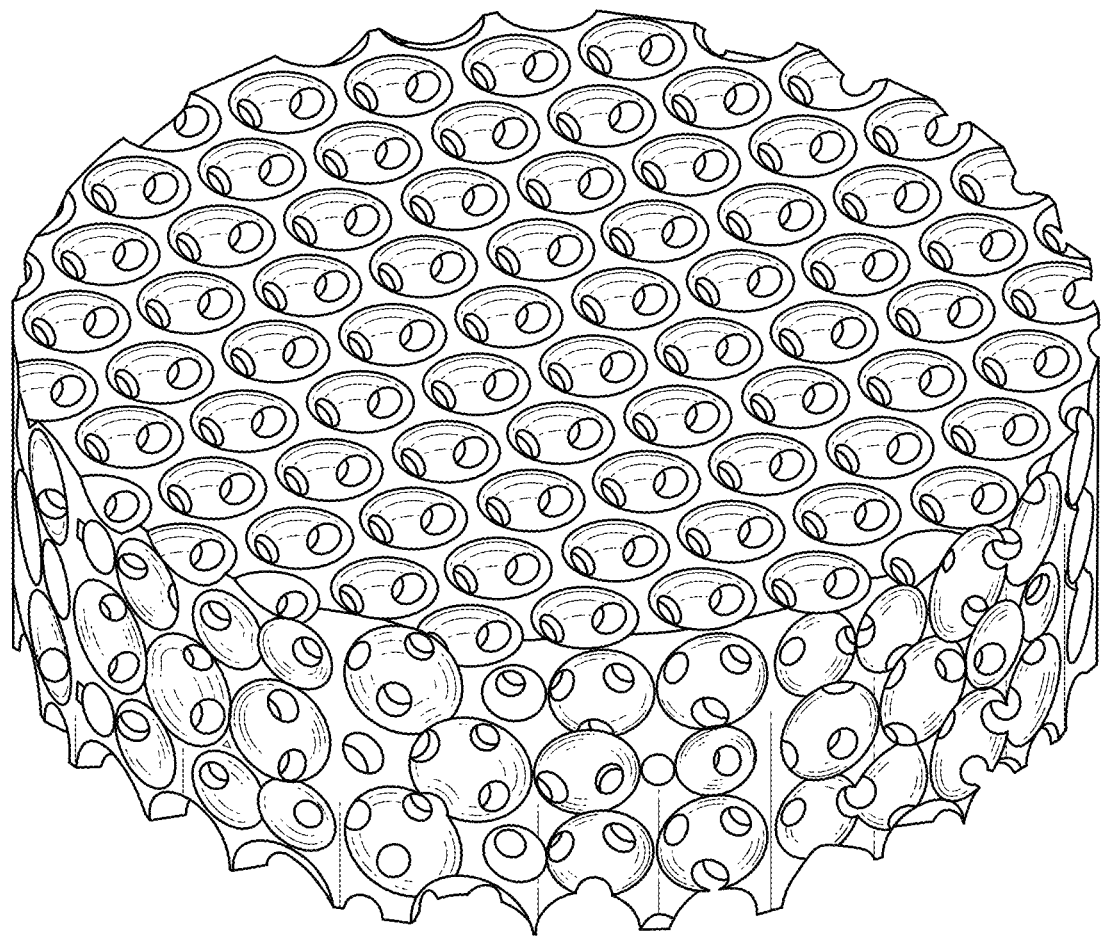
FIG. 1D illustrates the device of the first configuration and its fixed bed geometry showing an interconnected void system.
Figure 1E:
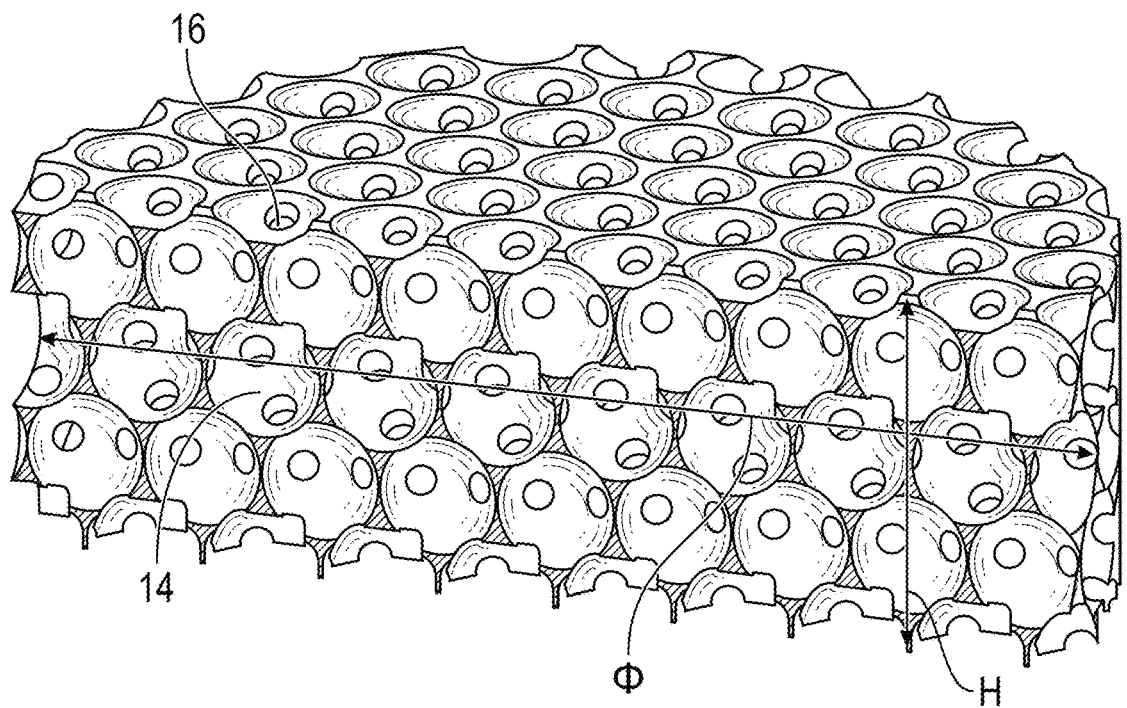
FIG. 1E illustrates the device of the first configuration in cross-sectional view.

FIG. 1B illustrates a unit negative model of the device 10 that shows the overlapping of neighborhood spheres. The device is then preferably created by reversing the negative model to create the positive model comprising the interconnected void system. More specific techniques for forming the device 10 are discussed herein. FIG. 1C illustrates a unit negative model with each sphere (defining a void region) surrounded by 12 identical neighborhood spheres. FIG. 1D illustrates the device 10 fixed bed geometry showing an interconnected void system. FIG. 1E illustrates the device 10 in cross-sectional view. It should be noted that preferably, the device 10 has a diameter Φ in the range of 2.0 mm to 10,000 mm and a height H in the range of 1.0 mm to 5,000 mm. Preferably the device 10 indicate a ratio Φ/H in the range of greater than 1:1.

Figure 1F:
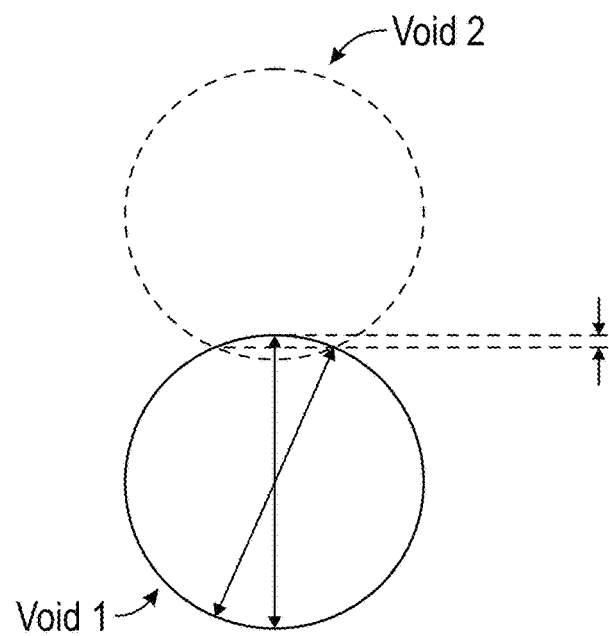
FIG. 1F illustrates in 2D view the device of the first configuration containing non-random spherical voids and their overlapping areas to form the interconnected openings or pores between such spherical voids.

FIG. 1F illustrates in 2D view the identified preferred non-random spherical voids and their overlapping areas to form the interconnected openings or pores between such spherical voids. For the preferred geometry illustrated in FIG. 1F, Spherical Void 1 is represented by a solid circle, diameter is D (indicated by the arrows). Diameter "D" may therefore be understood as the longest distance between any two points on the internal void surface. Spherical Void 2 is represented by a dash circle and would also have diameter D (not shown). Spherical Void 2 is one of the 12 of neighborhood voids of Spherical Void 1. Due to the overlap between the neighborhood voids, it forms interconnected pores between the spherical voids, with the diameter of "d" as also indicated by the generally horizontal arrow. Diameter "d" may therefore be understood as the longest distance between any two points at the pore opening. The total 3D spherical surface area of the void is $SA_{void}=4\times\pi\times(D/2)^2$. The surface area between A and B, called $S_{cap}=\pi\times D\times h$, where $$h = \frac{D - \sqrt{D^2 - d^2}}{2}.$$

The useful void surface for a given void in the 3D bioreactor would be $SA_u = SA_{void} - [12\times S_{cap}]$.

The smaller the void diameter D, the larger the number of voids can be packed into a set 3D space (volume), and therefore results larger overall surface. The diameter of the pores d may fall in the range of 0.01 mm to 10.0 mm and more preferably 0.05 mm to 2.0 mm as most mammalian cell size is between 5-100 µm Most preferably, d≥0.1 mm and falls in in the range of 0.1 mm to 2.0 mm.

If D=0.018 mm or less, the computed $SA_u$ is less than 0 when d=0.01 mm, which leads to an impossible structure therefore, D has to be >0.018 mm for this 3D bioreactor geometry. However, D can have a value in the range of 0.09 mm to 100.0 mm, more preferably, 0.2 mm to 50.0 mm, and also in the range of 0.4 mm to 25.0 mm. Accordingly, for the preferred geometry illustrated in FIG. 1F, D>0.4 mm (the diameter of the void) and d>0.20 mm (the diameter of the pore openings). It is also worth noting that with respect to any selected value of diameter D for the voids in the range of 0.018 mm to 100.0 mm, and any selected value of diameter d for the pores in the range of 0.2 mm to 10.0 mm, the value of D is such that it is greater than the value of d (D>1.8d).

It can now be appreciated that the device 10 can be characterized with respect to its non-random characteristics. Preferably, the voids within the 3D bioreactor are such that they have substantially the same volume to achieve the most efficient 3D space packing and offer the largest corresponding surface area. With respect to the total number of interconnected voids present in any given cell purification device, preferably, 90.0% or more of such voids, or even 95.0% or more of such voids, or even 99.0% to 100% of such voids have a void volume (V) whose tolerance is such that it does not vary by more than +/−10.0%, or +/−5.0%, or +/−2.5% or +/−1.0%, or +/−0.5% or +/−0.1%. It should be noted that while the voids in FIG. 1A are shown as generally spherical, as repeatedly noted, other void geometries are contemplated. The diameter of voids are therefore preferably chosen to optimize cell purification.

As noted, another non-random characteristic of the device 10 herein are the pore openings between the voids, having a diameter d (see again FIG. 1E). Similar to the above, 90.0% or more of the pore openings, or even 95.0% or more of the pore openings, or even 99.0% to 100% of the pore openings between the voids, indicate a value of d whose tolerance does not vary more than +/−10.%, or +/−5.0%, or +/−2.5% or +/−1.0%, or +/−0.5% or +/−0.1%. The diameter of pore openings are preferably chosen to optimize unbound cells released from the bioreactor.

It can therefore now by appreciated that the device 10 herein for cell separation comprises a plurality of voids having a diameter D (the longest distance between any two points on the internal void surface), a plurality of pore openings between said voids having a diameter d (the longest distance between any two points at the pore opening), where D>1.8d. In addition, 90% or more of the voids have a void volume (V) that does not vary by more than +/−10.0%, and 90% or more of the pore openings have a value of d that does not vary by more than +/−10.0%.

In addition, the device herein for cell separation can include a first plurality of voids having a diameter $D_1$, a plurality of pore openings between said first plurality of voids having a diameter $d_1$, wherein $D_1 > d_1$, where 90% or more of the first plurality of voids have a void volume ($V_1$) with a tolerance that does not vary by more than +/−10.0%. Such device may also have a second plurality of voids having a diameter $D_2$, a plurality of pore openings between said second plurality of voids having a diameter $d_2$ wherein $D_2 > d_2$, wherein 90% of the second plurality of voids have a void volume ($V_2$) with a tolerance that does not vary by more than +/−10.0%. The values of $V_1$ and $V_2$ are different and outside of their tolerance variations. Stated another way, the value of $V_1$, including its tolerance of +/−10.0% and the value of $V_2$, including its tolerance of +/−10.0%, are different, or $[V_1+/-10.0\%] \neq [V_2+/-10.0\%]$.

The device herein for cell separation may also be constructed in a second configuration comprising a plurality of non-random solid geometrical structures and optionally, a plurality of non-random solid interconnecting elements between such structures. Such solid geometrical structures may preferably include spheres, ovals, and/or polygonal shapes, thereby presenting an outer surface for cell purification. As noted, such solid geometrical structures may optionally be connected via a plurality of solid interconnecting elements. Such solid interconnecting elements may also assume various geometrical shapes, including rod or columnar shape, oval shape, and/or polygonal type shape. Such solid interconnecting structures may also all provide an outer surface for cell separation. It should be noted that reference to solid geometrical structures as well as solid interconnecting elements is reference to the fact that such structures and elements provide an outer surface for cell separation as disclosed herein. The solid geometrical structures or the solid interconnecting elements themselves are not necessarily completely solid and may contain a partially hollow interior. Accordingly, the partially hollow interior may be utilized to place nutrients and/or other reagents and/or for gas transfer. Such nutrients and/or reagents and gas transfer may then operate to improve the performance of the devices herein for cell separation.

Figure 2A:
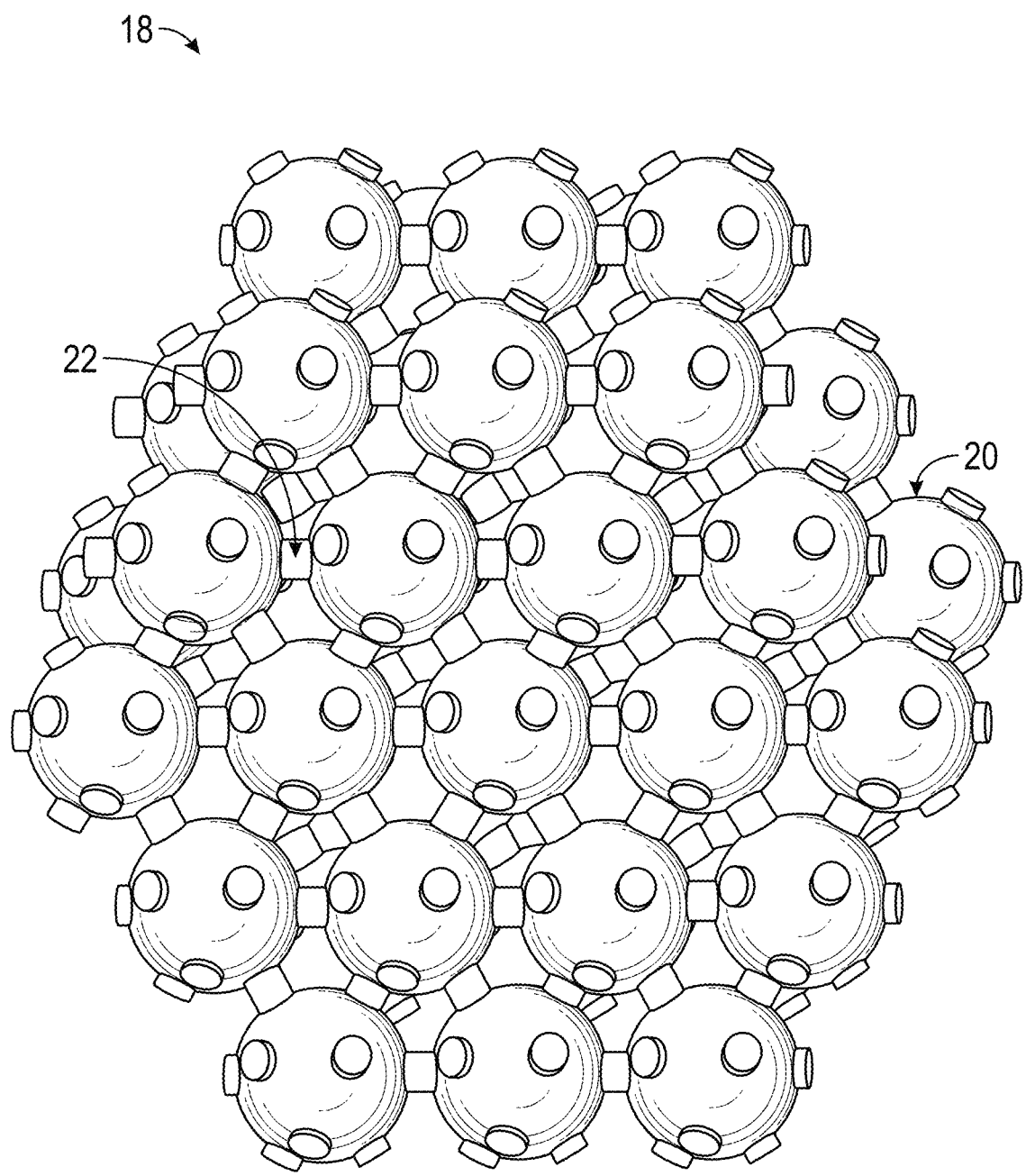
FIG. 2A illustrates a portion of the device herein of the second configuration.
Figure 2B:
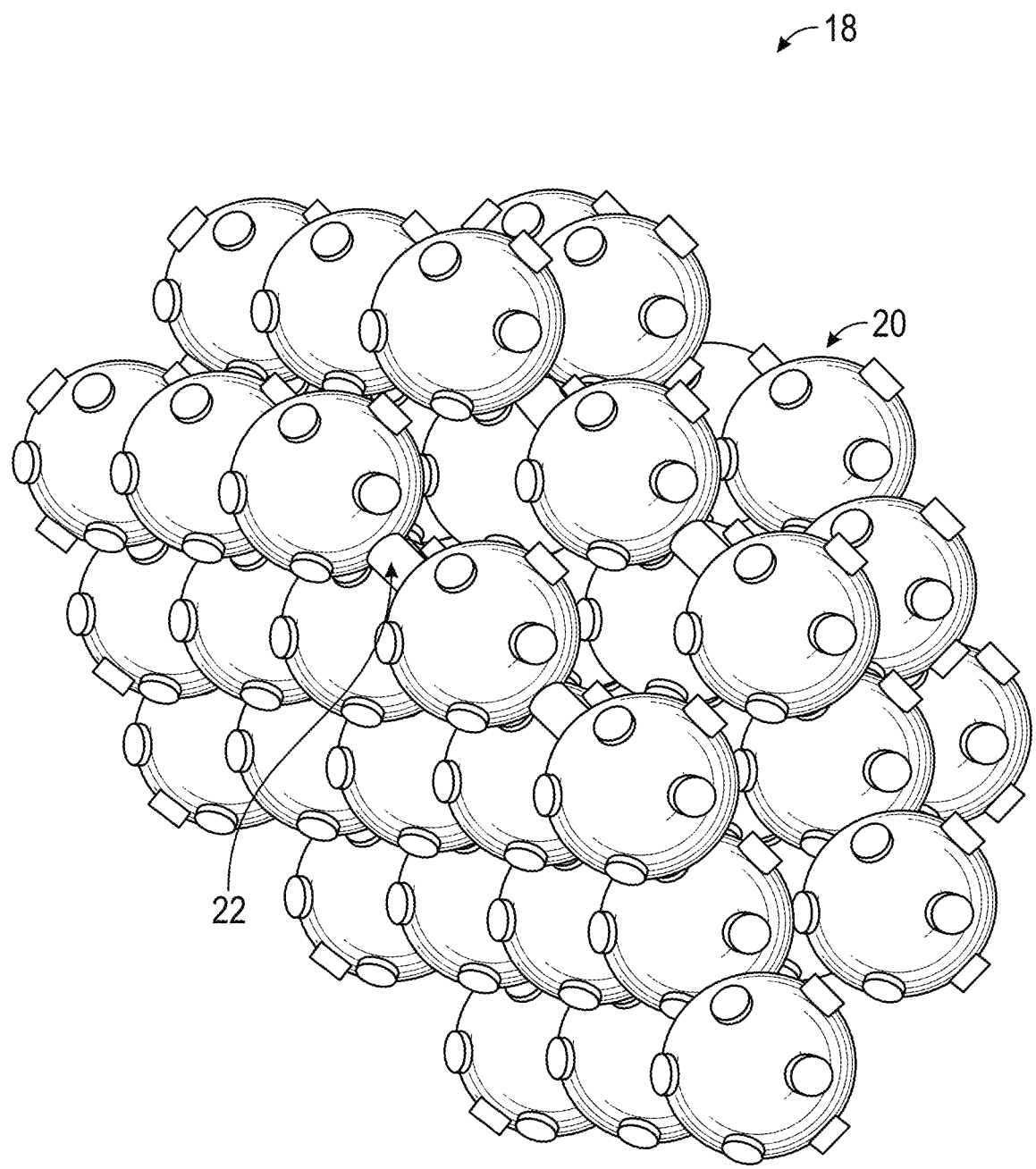
FIG. 2B illustrates a portion of the device herein of the second configuration.
Figure 2C:
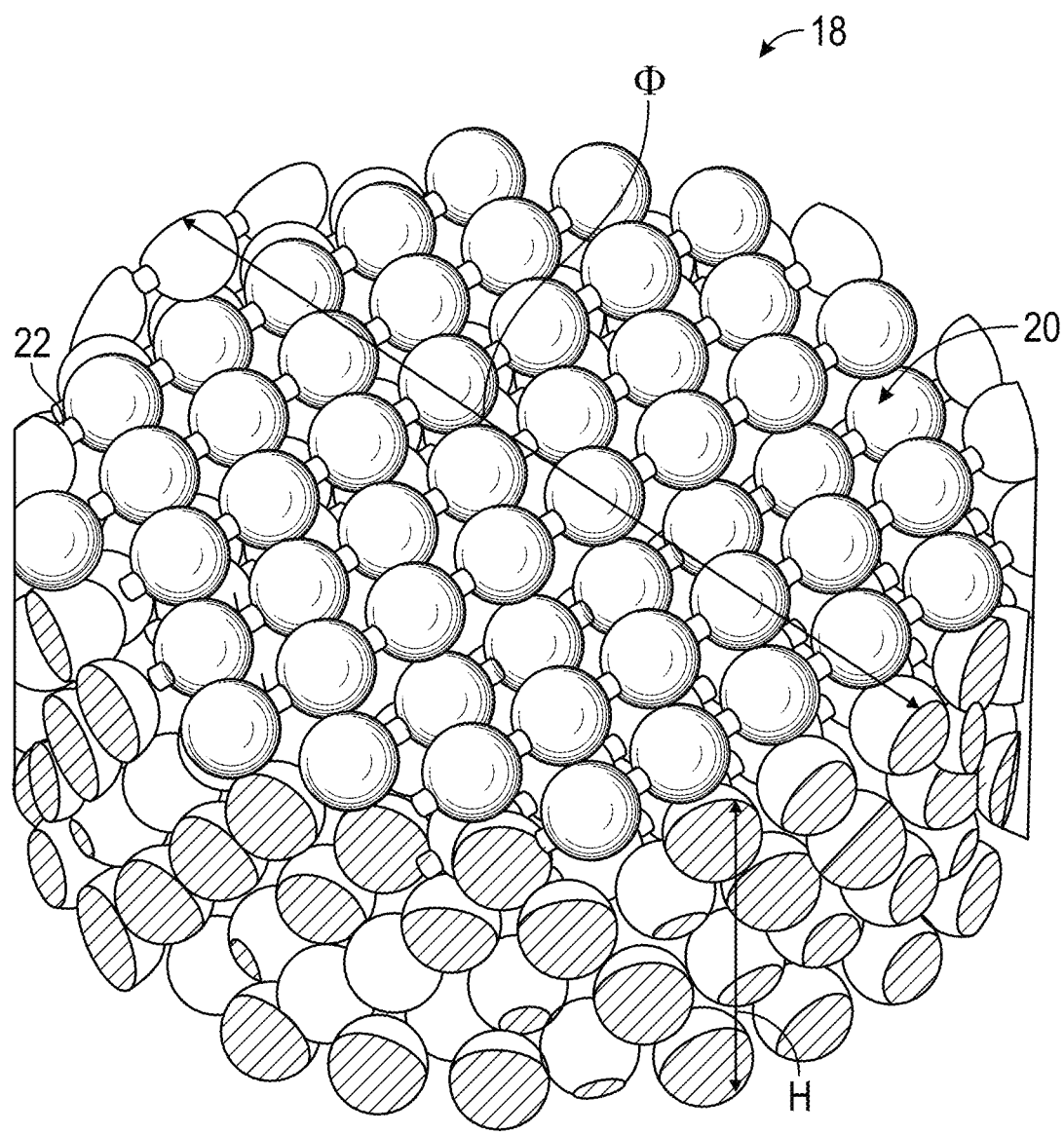
FIG. 2C illustrates a preferred configuration of the device herein of the second configuration.

FIGS. 2A and 2B illustrate a portion of a first preferred device 18 of the second configuration wherein the solid non-random geometrical structures and optional solid non-random geometrical interconnecting elements preferably comprise spheres 20 and interconnecting rods 22. FIG. 2C illustrates one preferred configuration for the device 18 where it can be appreciated that the plurality of spheres 20 and plurality of interconnecting rods 22 are preferably organized in two or more layers where each layer is offset from an adjacent layer. Such offset of the layers can therefore promote fluid flow through the device 18 to enhance the interaction between the fluid flow and the spheres 20. In addition, the plurality of spheres 20 can each be preferably connected by 4, 5, 6, 7, or 8 rods.

In addition, as illustrated in FIG. 2C, the device 18 preferably has a diameter Φ in the range of 2.0 mm-10,000 mm and a height H in the range of 1.0 mm-5,000 mm. Preferably the device 10 indicate a ratio Φ/H in the range of greater than 1:1.

Figure 2D:
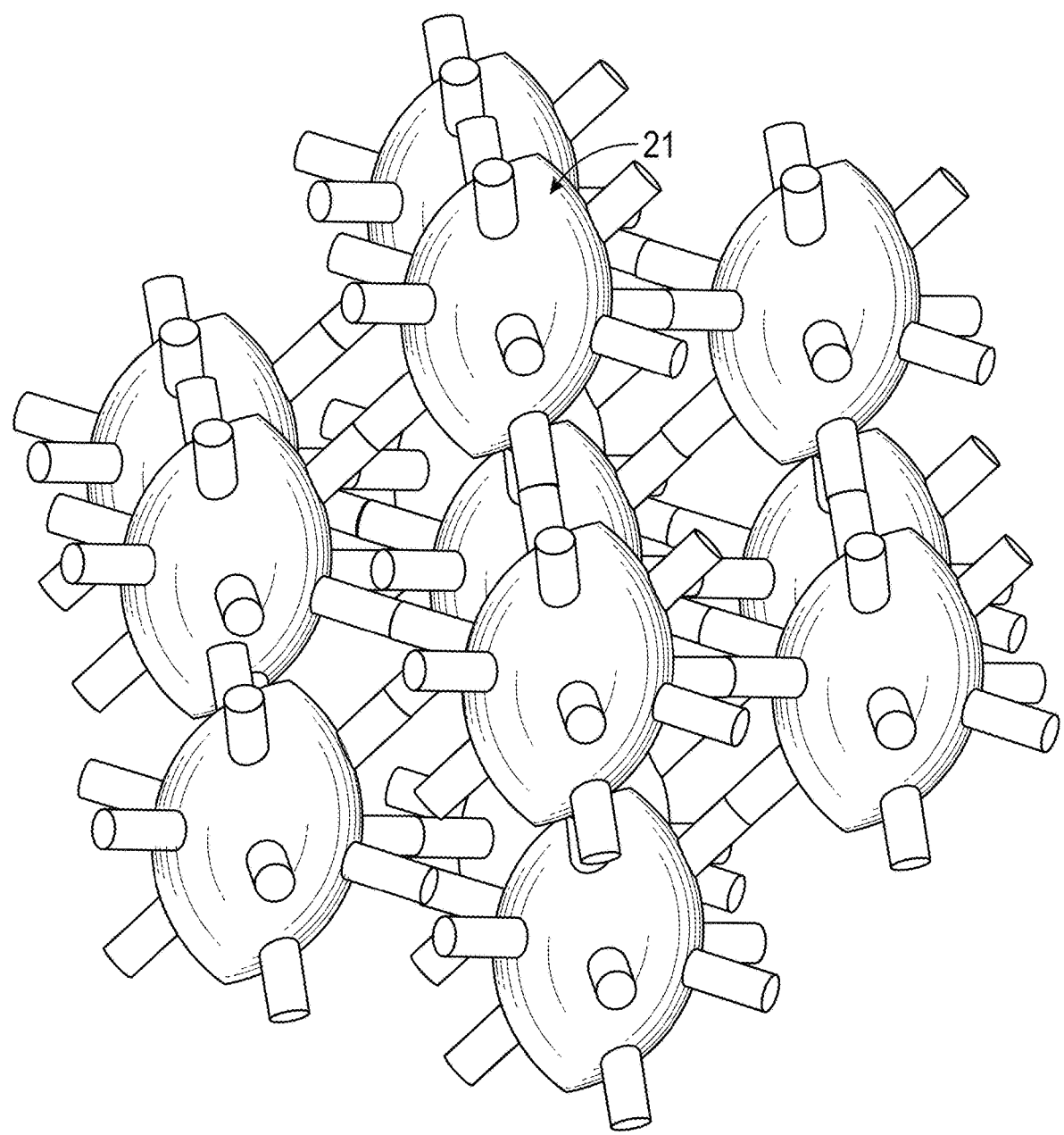
FIG. 2D illustrates a preferred shape of the device herein of the second configuration wherein the non-random geometrical shapes include oval structures.
Figure 2E:
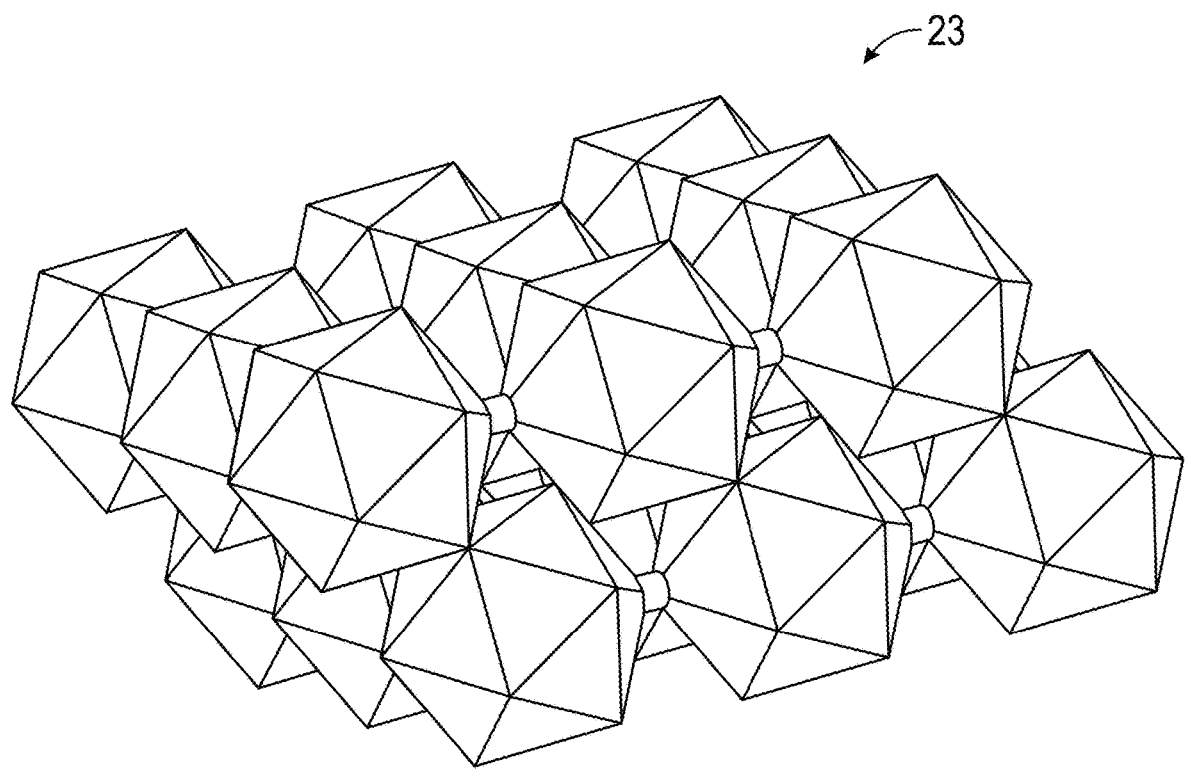
FIG. 2E illustrates a preferred shape of the device herein of the second configuration wherein the non-random solid geometrical structures include a polygonal structure.
Figure 2F:
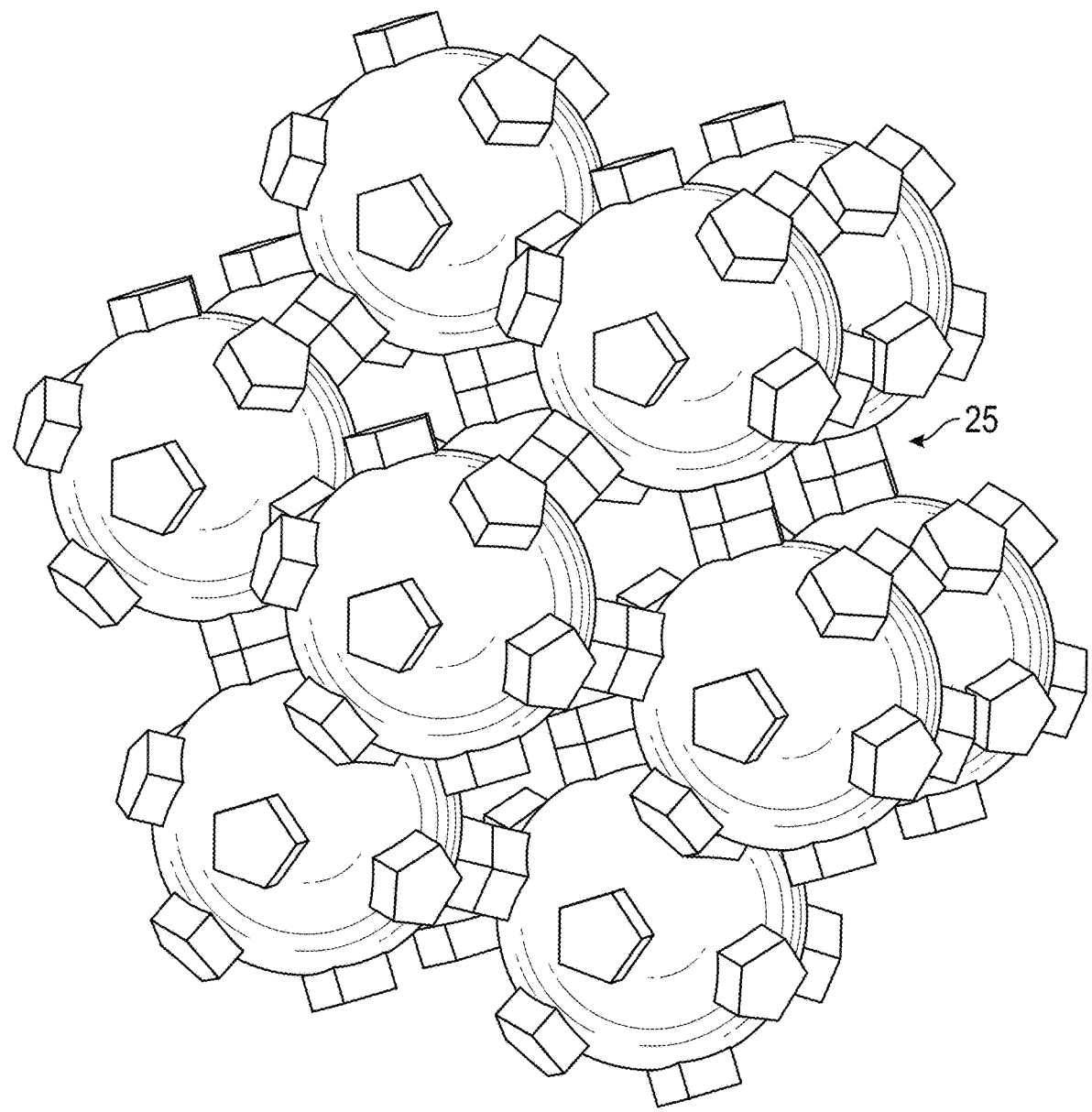
FIG. 2F illustrates another preferred shape of the device of the second configuration wherein the solid interconnecting structures include a polygonal shape.

FIG. 2D illustrates a preferred shape of the device of the second configuration wherein the non-random solid geometrical shapes include oval structures 21 (outline of an egg). FIG. 2E illustrates another preferred shape of the device of the second configuration wherein the non-random solid geometrical structures include polygonal structure 23. FIG. 2F illustrates another preferred shape of the device of the second configuration wherein the solid interconnecting structures 25 between the spheres include a polygonal shape.

Figure 3:
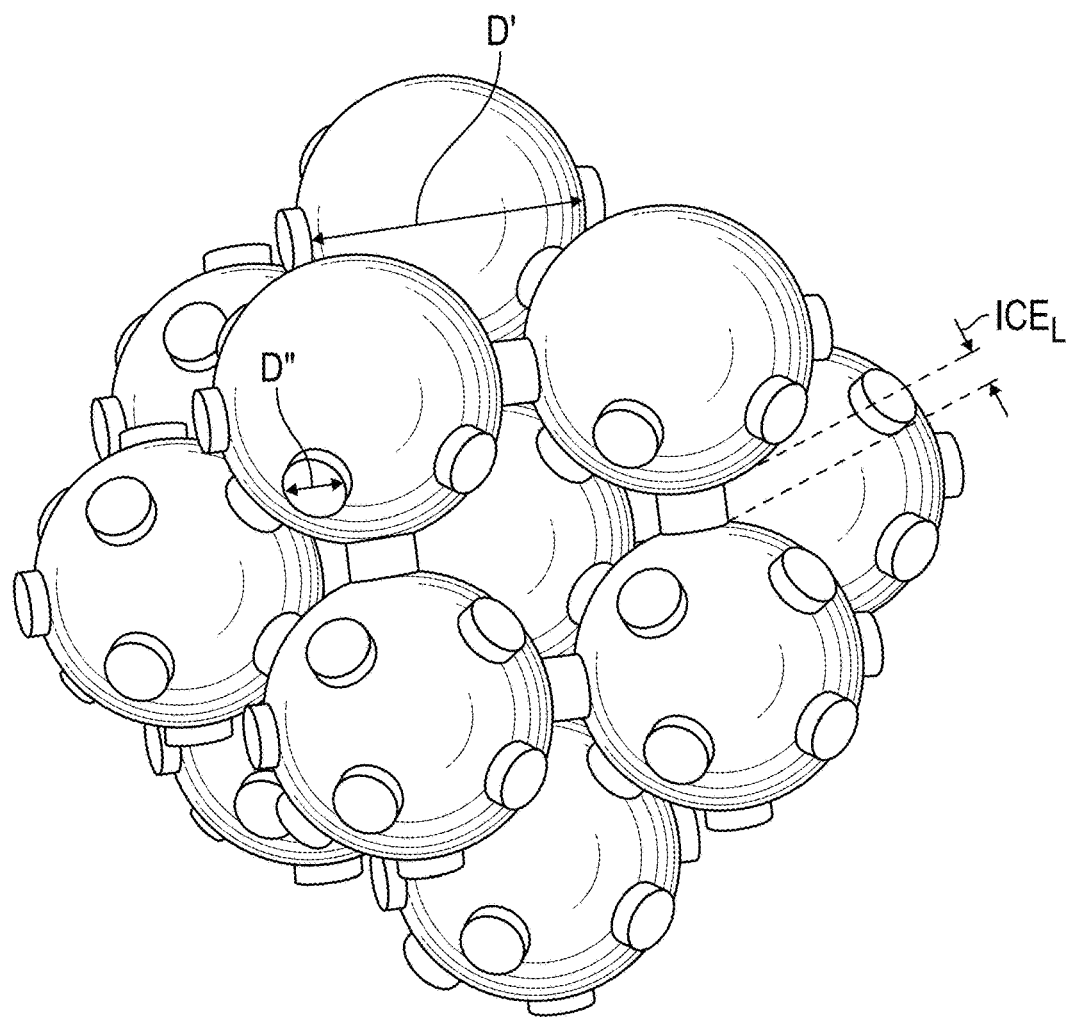
FIG. 3 illustrates a portion of the device of the second configuration illustrating the exemplary use of spheres and optional use of interconnecting rod elements.

A portion of the device of the second configuration is illustrated in FIG. 3, with respect to the exemplary use of spheres and the optional use of interconnecting rod elements. The non-random solid geometrical shapes herein preferably have a diameter D' (longest distance between two points on the outer surface of the solid geometrical structure and through the structure interior) in the range of 2.0 μm to 25.0 mm, 200 microns to 25.0 mm, 5.0 μm to 10.0 mm, or 5.0 μm to 6.0 mm. Another preferred value for D' is in the range 1.0 mm to 25.0 mm.

The solid geometrical interconnecting elements (ICE) preferably have a diameter D" in the range of 1.0 μm to 12.5 mm, more preferably in the range of 1.0 μm to 3.0 mm. The length of the solid interconnecting structures $ICE_L$ preferably ranges from 0.1 μm to 25.0 mm, more preferably 100.0 μm to 5.0 mm, and even more preferably, 100.0 μm to 3.0 mm. It is also preferred that the diameter of the solid interconnecting structures (e.g. rods) are less than half of the value of the diameter of the solid geometrical shapes (e.g. spheres).

Similar to the first configuration of the device noted above, the second configuration can also be characterized by its overall non-random characteristics. That is, with respect to the solid geometrical structures (e.g., spheres 20), 90% or more of such solid geometrical structures, or even 95.0% or more of such solid geometrical structures, or even 99.0% to 100% of such solid geometrical structures, define a volume whose tolerance is such that it does not vary by more than +/−10.0%, or +/−5.0%, or +/−2.5% or +/−1.0%, or +/−0.5% or +/−0.1%. Similarly, with respect to the optional use of the solid interconnecting elements (e.g., rods 20), 90% or more of such solid interconnecting elements, or even 95.0% or more of such solid interconnecting elements, or even 99.0% to 100% of such solid interconnecting elements, define a volume whose tolerance is such that it does not vary by more than +/−10.0%, or +/−5.0%, or +/−2.5% or +/−1.0%, or +/−0.5% or +/−0.1%.

The device of the first configuration or second configuration are preferably made of biocompatible or bio-inert polymeric materials such as polystyrene, polycarbonate, acrylonitrile-butadiene-styrene (ABS), polylactic acid (PLA), polycaprolactone (PCL) used in FDM (fused deposition modeling) 3D printing technology. Reference to biocompatible or bio-inert should be understood as a material that is non-toxic to the culturing cells. In addition, the polymeric materials for the device of the first or second configuration are preferably selected from those polymers that at not susceptible to hydrolysis during cell cultivation, such that the amount of hydrolysis does not exceed 5.0% by weight of the polymeric material present, more preferably it does not exceed 2.5% by weight, and most preferably does not exceed 1.0% by weight. The device of the first or second configuration may also be made of biocompatible photosensitive materials (e.g., Pro3Dure, Somos WaterShed XC 11122, etc.) used in SLA (stereolithography) and DLP (digital light processing) 3D printing technologies. Furthermore, the device of the first or second configuration may be formed of an interpenetrating polymer network (IPN). An IPN is reference to a polymer comprising two or more networks which are at least partially interlaced on a polymer scale but not covalently bonded to each other.

It is preferable that the material used to fabricate the devices of either the first or second configuration herein are not degradable in aqueous medium and can provide a mechanical stable structure to tolerate aqueous medium flow during cell purification. It is preferable that the material and manufacturing process can result a solid and relatively smooth interconnected surface area. By reference to a solid surface, it should be further understood that the surface is such that it will preferably reduce or prevent penetration or embedding by cells, which typically have a diameter of about 20 microns to 100 microns. Preferably, the devices herein of either the first or second configuration have a surface that has a surface roughness value (Ra), which is reference to the arithmetic average of the absolute values of the profile height deviations from the mean line, recorded within an evaluation length. Accordingly, it is contemplated herein that Ra of the devices herein will have a value of less than or equal to 20 µm, more preferably, less than or equal to 5 µm.

The devices of the first or second configuration herein are also preferably formed from material that indicates a Shore D Hardness of at least 10, or in the range of 10-95, and more preferably in the range of 45-95. In such regard, it is also worth noting that the devices herein preferably do not make use of a hydrogel type structure, which may be understood as a hydrophilic type polymeric structure, that includes some amount of crosslinking, and which absorbs significant amounts of water (e.g., 10-40% by weight). It is also worth noting that the devices herein preferably do not make use of collagen, alginate, fibrin and other polymers that cells can easily be digested and undergo remodeling.

Furthermore, the devices herein of the first or second configuration are preferably made from materials that have a Tensile Modulus of at least 0.01 GPa. More preferably, the Tensile Modulus has a value that is in the range of 0.01 GPa to 20.0 GPa, at 0.01 GPa increments. Even more preferably, the Tensile Modulus for the material for devices herein are in the range of 0.01 GPa to 10.0 GPa or 1.0 GPa to 10 GPa. For example, with respect to the earlier referenced polymeric materials suitable for manufacture of the devices herein, polystyrene indicates a Tensile Modulus of about 3.0 GPa, polycarbonate at about 2.6 GPa, ABS at about 2.3 GPa, PLA at about 3.5 GPa and PCL at about 1.2 GPa.

The devices herein of either the first or second configuration with such preferred regular geometric characteristics and/or surface area are preferably fabricated by additive manufacturing technologies, such as fused deposition modeling FDM, selective laser sintering (SLS), stereolithography (SLA), digital light processing (DLP) 3D printing technologies, etc., according to computer generated designs made available by, e.g., a SolidWorks™ computer-aided design (CAD) program.

Figure 4:
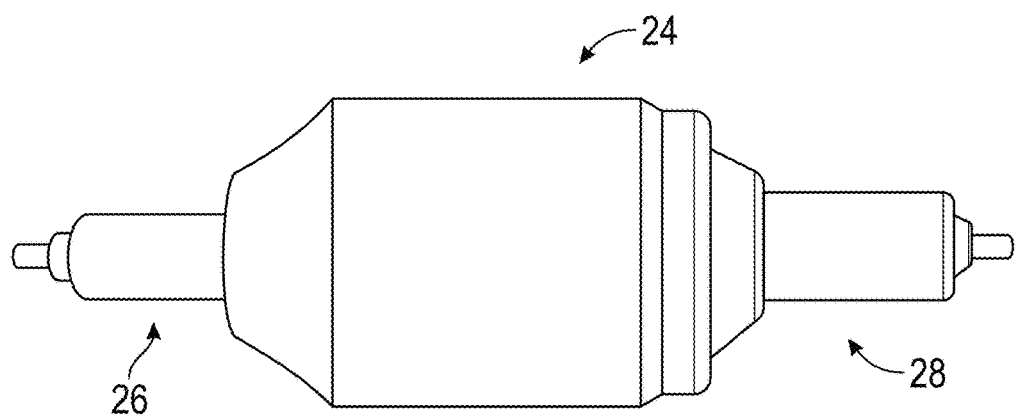
FIG. 4 illustrates the device of either the first or second configuration positioned in a housing between an inlet and outlet for inflow and outflow of fluid containing cells for separation.

The devices of the first or second configuration may then be configured such that they may configured as a fixed bed along with an inlet and outlet to allow for inflow and outflow of fluid. Reference is made to FIG. 4 wherein the device of either the first or second configuration noted above may be positioned in a housing 24 and then placed between and inlet 26 and outlet 28 for which inflow and outflow of fluid may be provided containing cells for separation.

The surfaces of the device of the first or second configuration are preferably coated and functionalized such that they allow for selective ligand or cell binding. Reference to cell binding may therefore be understood to include a chemical interaction between the cell and the coating, such as covalent binding and/or secondary type binding (e.g. polar interactions or hydrogen type bonding). For example, in the case of the device of the first configuration, exemplified by the voids 14 illustrated in FIG. 1A, the surface of such voids can be so functionalized, and in the case of the device of the second configuration, the surfaces of the solid spheres 20 and interconnecting elements 22 in FIG. 2C can also be similarly functionalized. When a mixed population of cells flows through the device of either the first or second configuration, with such functionalized surfaces, the binding of the cells allow for separation and capture of target cells while allowing the rest of the cells to pass through.

Figure 5:
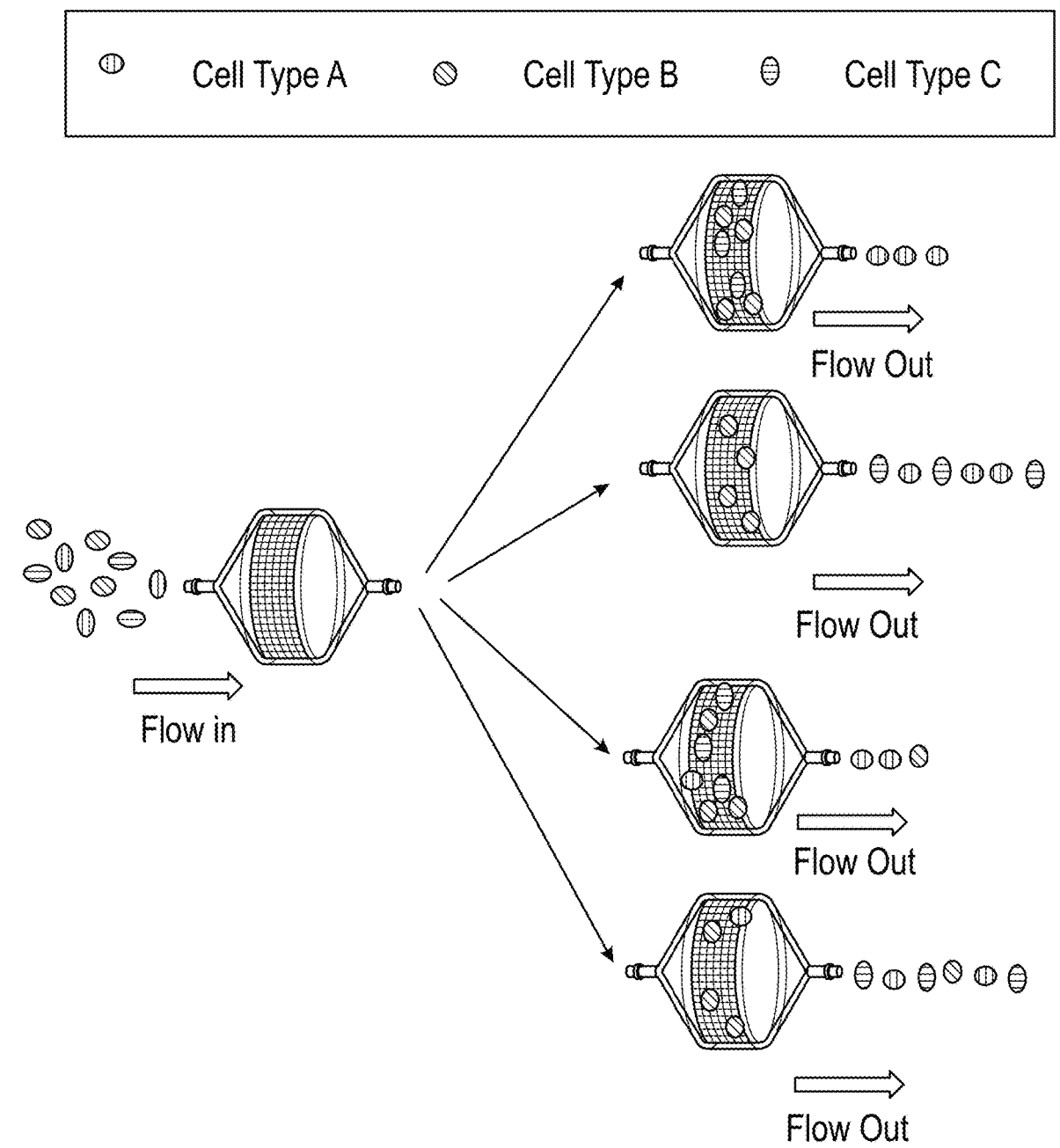
FIG. 5 illustrates the cell separation that can be achieved with the device herein of either the first or second configuration.

FIG. 5 illustrates the cell separation that can now be achieved with the device herein of either the first or second configuration when employed in a fluid flow. As illustrated at 30 a plurality of cells, e.g., types A, B and C, are preferably suspended in a fluid that flows into the device and through the fixed bed. Depending on the characteristics of the surface coating on the fixed bed, different levels of cell separation will be obtained.

For example, depending upon the surface coating, and in Case I, and as shown at 32 in FIG. 5, cell Types B and C are selectively captured by the surface coating of the fixed bed. In such manner, it can be appreciated that Cell Type A may therefore be said to be selectively separated from a plurality of cell types A, B and C. This is also understood herein as negative cell selection, in that the unwanted cells (B and C) are depleted from the mixture and remain within the device. As noted above, this also represents an affinity-based technique of cell separation.

In addition, depending again on the surface coating, and in Case II, and as shown at 34, cell type B is separated and captured on the surface coating of the fixed bed, and cell types A and C flow out. This is known herein as positive cell selection, in that the targeted cell B is retained in the device and cells A and C pass through. In such manner, it can be appreciated that cell type B may therefore be said to be selectively separated from cell types A and C.

The above being the case, it should be appreciated that the device herein of either the first or second configuration with its available surfaces can be coated and functionalized, such that a selected cell can be separated, which as noted herein includes the feature that the cell may be isolated, purified, and/or enriched from a plurality of cells. In addition, for a given plurality of cells within a fluid that passes through the device herein of either the first or second configuration, the separation of a selected cell from the plurality of cells can be achieved by: (1) capturing the selected cell on the coated or functionalized surface of the devices herein; and/or (2) capturing the selected cell within the fluid output.

As further illustrated at 36 and 38, although the devices herein of either the first and second configuration can be provided with surface functionalization to provide for the above referenced affinity type cellular separation, some limited amount of non-affinity type interactions may occur. More specifically, at 36, although the surface was functionalized to capture cells B and C, some relatively small amount of capture of cell A may occur. At the same time, a relatively small amount of B or C cells may be present at the output of the device. In addition, as shown at 38, although the surface was functionalized to capture only cell B, some relatively small amount of cell A may also be immobilized within the device.

Therefore, the efficiency of cell separation that occurs with the devices herein of either the first or second configuration can be quantitatively described as selectively isolating a targeted cell from a plurality of cells at a level of greater than 50% of the total targeted cells introduced into the device. More preferably a selected or targeted cell can now be separated from a plurality of cells at a level of greater than 50% to 100%, more preferably at a level of 60% to 100%, or 70% to 100%, or 80% to 100%, or 90% to 100%, or 95% to 100% of the total targeted cell introduced into the device. Reference to such quantitative efficiency of cell separation from a plurality of cells introduced into the device occurs herein by: (1) capturing the selected or targeted cell(s) on the surface of the devices herein (or called positive selection); and/or (2) providing the selected or targeted cell(s) within the fluid output after passing through the devices herein (also called negative selection).

With regards to surface coating of the devices of either the first or second configuration, preferably, such coatings are those that may also provide for affinity-based cellular capture. The coatings may therefore preferably comprise substituted or unsubstituted poly(p-xylylene) from the polymerization of parylene monomers, β-casein or polydopamine (PDA). Such coatings may preferably be present at a thickness in the range of 200 Angstroms to 100.0 μm.

Accordingly, the coating procedure preferably relies upon the use of parylene monomers, e.g., [2.2]paracyclophanes, that may be preferably functionalized with identified $R_1$, $R_2$, $R_3$ and $R_4$ groups according to the following general reaction scheme. It should be appreciated that in the scheme below, the start of polymerization is initiated by a ring opening at elevated temperature (~550° C.) in the low pressure gas phase remotely prior to deposition on the 3D device which is preferably maintained at relatively lower temperature (e.g., ≤100° C.):

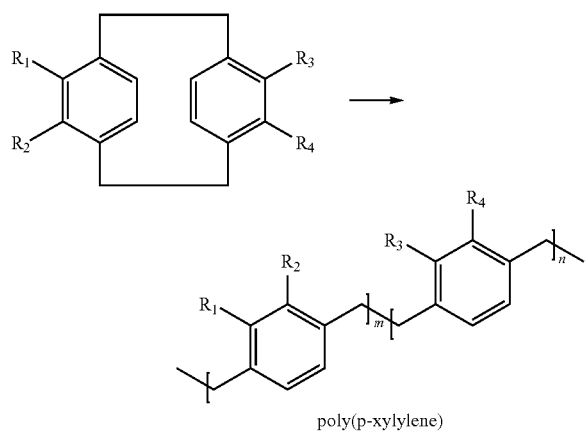

poly(p-xylylene)

In the above, when one of the R groups per repeat unit "m" and/or repeat unit "n" is chlorine, and the other R groups are hydrogen, the above represents the polymerization of parylene C. It is a USP Class VI and ISO-10993-6 certified biocompatible material. The values of "m" and "n" of the identified crosslinked, repeating units are such that molecular weight values are relatively high, such as ~500,000. It is therefore contemplated that the use of the parylene monomers and ensuing polymeric coatings are such that one may now coat the devices of the above reference first or second configuration herein with an impermeable film. The film may preferably have a thickness between 200 Angstroms to 100.0 μm. It may be appreciated that $R_1$, $R_2$, $R_3$, and $R_4$ may be selected from hydrogen, a halogen (—Cl or —Br) as well as other functional groups such as amines (—NH$_2$), aliphatic aldehydes (—CHO), carboxylic acid functionality (—COOH), hydroxyl (—OH) or carboxylate functionality as in —C(O)CF$_3$. One may also initially coat with a first layer of impermeable parylene C followed by a coating of a different parylene, e.g., wherein $R_1$, $R_2$, $R_3$, and $R_4$ may then be selected from an amines (—NH$_2$) and/or aldehyde (—CHO) functionality. Accordingly, one may provide polymeric coatings for the devices herein of the first and/or second configuration, wherein the coating comprises a plurality of layers, each with its own particular and different chemical composition (i.e. the identity of at least one of $R_1$, $R_2$, $R_3$, and $R_4$ are different between at least two of the layers).

One preferred method of coating the surface of the devices herein with functionalized poly(p-xylylene) applies when one or more of the $R_1$, $R_2$, $R_3$ and/or $R_4$ groups noted above comprise ester carboxylic acid functionality. In such case, one may utilize N-hydroxysuccinimide (NHS) to form an ester linkage. Next, NH$_2$-mPEG (methoxy terminated oligoethylene glycol) or NH$_2$-PEG-biotin may be covalently bonded to the device surface via the amine-NHS ester reaction to form an amide bond. Then, avidin or NeutrAvidin or streptavidin can be bound to the biotin. As avidin/NeutrAvidin/streptavidin have four bonding sites, the remaining three sites are then available to bind biotinylated antibodies, such as anti-CD3 and anti-CD28 to capture T cells through surface receptors specific to these antibodies.

It is further contemplated that the cell separation devices herein of either the first or second embodiment, with a functionalized poly(p-xylylene) coating wherein one or more of $R_1$, $R_2$, $R_3$ and $R_4$ comprise an aldehyde can undergo reaction with, e.g., antibody proteins (e.g. anti-CD3/28) with end flexible tethers that are amino terminated (or other organic terminal group) of an oligoethylene oxide (OEG) of different lengths. In other words, the use of OEG type tethers that include functional terminal groups such as an amine group, as in:

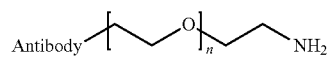

where the value of n may be in the range of 1-200, and which may then bind to the functionalized parylene coating on the devices herein as follows, where one binding reaction site is illustrated and where it should be appreciated that multiple binding reactions may take place depending upon regulation of the reaction parameters (e.g. temperature and time to increase binding reaction yield):

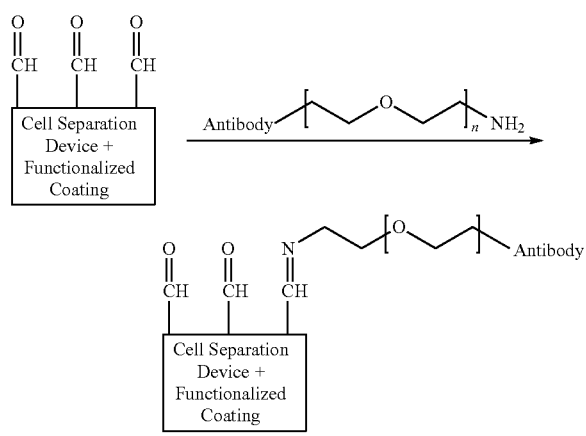

As may therefore be appreciated, in the above, one may vary the identified antibody to target selected cell surface receptors, distinctive for a given cell phenotype for a given cell separation protocol. In addition, the antibody as shown may be surface inter-dispersed with poly(ethylene oxide) (PEG) and/or methyl terminated PEG (mPEG) of varying molecular weights to minimize non-specific adsorption.

In addition, in the case of poly-p-xylylene coating, it is contemplated that one may chemically modify the surface of such coatings via plasma activation where a gas, such as oxygen, ammonia or mixtures of these gases with volatile polymerizable monomers are ionized by plasma discharge and allowed to condense and form a functionalized coating on the poly(p-xylylene) structure.

In addition, it is contemplated that when the poly(p-xylylene) herein is not functionalized, one may apply a molecule containing a hydrophobic and hydrophilic end, which is then coated on the unfunctionalized poly-p-xylylene coating. The hydrophobic end of the molecule is therefore contemplated to coat the unfunctionalized poly-p-xylylene leaving the hydrophilic end, containing various reactive groups, capable of affinity bonding with a given cellular surface. Along such lines, it is contemplated that one may therefore utilize as one example, β-casein, which would then be applied on the poly(p-xylylene) coating.

As also noted, the devices may be coated directly with PDA to facilitate the binding of, e.g., a biotin linker and/or mPEG layer. More specifically, one may form a PDA coating on the surfaces of the devices here which at pH 8.5 is converted to a diquinone type structure which can then undergo Michael addition and Schiff base formation. More specifically, $NH_2$-mPEG or $NH_2$-PEG-biotin can be immobilized on the PDA layer. The immobilized $NH_2$-PEG-biotin can then be further conjugated with avidin/NeutrAvidin/streptavidin and then a biotinylated antibody and or aptamers.

EXAMPLES

NHS-Ester Functionalized Poly(p-xylylene) (Parylene C type)

Flat disk test coupons, with 1.0 cm² surface area, were SLA printed. The disks were then washed and parylene C coated. NHS-ester functionalized parylene was then synthesized. A layer of NHS-ester functionalized parylene film was coated onto the test coupons using the CVD process discussed above. Commercially available biotin-$PEG_{23}$-$NH_2$ (note: $(PEG)_{23}=(-CH_2CH_2-O-)_{23}$ was then bound to the disk surface through the NHS-ester surface functionality to form an amide bond. This commercially available biotin-$PEG_{23}$-$NH_2$ had a MW of 1299.60.

The areal density of biotin-$PEG_{23}$-$NH_2$ molecules immobilized on the coupons under different reaction conditions was quantified using commercially available fluorescein labeled NeutraAvidin. The coupons without NHS-ester functionalized parylene coating were used as a negative controls registering only background fluorescence. To assess the average fluorescent intensity from the disk surface, four images were taken at four different locations on the coupons and the average relative fluorescence units (RFU) calculated for each coupon. It was established that an incubation time of 6 hours at pH=7 was preferred for conjugating biotin-$PEG_{23}$-$NH_2$ to the NHS-coated test coupons through an amide bond.

Next, an evaluation was made of the preferred concentration of NeutraAvidin to bind to the biotin-$PEG_{23}$-amide-immobilized on the test disks. The QuantiPro™ BCA assay kit (Sigma-Aldrich) was used to quantify the residual NeutrAvidin in the solution after incubation with the coupons. The residual concentration of NeutrAvidin was determined using a standard curve generated with known concentrations of NeutrAvidin beforehand using the BCA kit. The bound NeutrAvidin (in micrograms) was then derived by subtracting the residual unbound NeutrAvidin from the total amount of NeutraAvidin in the incubation solution. The results indicated that 10 mg/mL NeutrAvidin yielded the most bound NeutraAvidin.

Based on the results above, 5 mM biotin-$PEG_{23}$-$NH_2$ and 10 mg/ml NeutrAvidin concentrations were used to test the binding of biotinylated CD3 antibody (Miltenyi Biotech) to the coupons. After NeutraAvidin with four available biotin binding sites was bound to the immobilized biotin-$PEG_{23}$-amide- on the coupons, sites were still available to immobilize biotinylated CD3 antibody which in turn can reversibly bind/capture CD3+(receptor) T cells. In order to characterize the biotinylated CD3-antibody binding to NeutrAvidin at different concentrations, namely at 30 µg/ml, 20 µg/ml, and 10 µg/ml, 150 µl of each concentration were added to the coupons in separate experiments.

In all experiments, the QuantiPro™ BCA assay was used to quantify the residual unbound CD3 antibodies. After reaction, the coupons were washed with PBS and then the residual unbound protein in the total collected washing solution was measured to assess the amount of bound CD3 antibody. A standard curve was established beforehand using different concentrations of biotinylated CD3 antibodies using the same BCA assay.

To test whether the NHS ester surface might bond directly to the amino groups of the NeutrAvidin, the NHS ester-parylene coated test disk was treated with 10 mg/ml NeutrAvidin and subsequently with 10 µg/ml biotinylated CD3 antibody, but without precoating with a biotin-$PEG_{23}$-amide-layer. However, the aqueous reaction conditions used were such that the unstable NHS functional groups could have been hydrolyzed prior to reacting with the potentially more slowly reacting amino groups of NeutrAvidin. Thus no binding of the NeutrAvidin took place and no binding of biotinylated CD3 antibody was detected.

Figure 6:
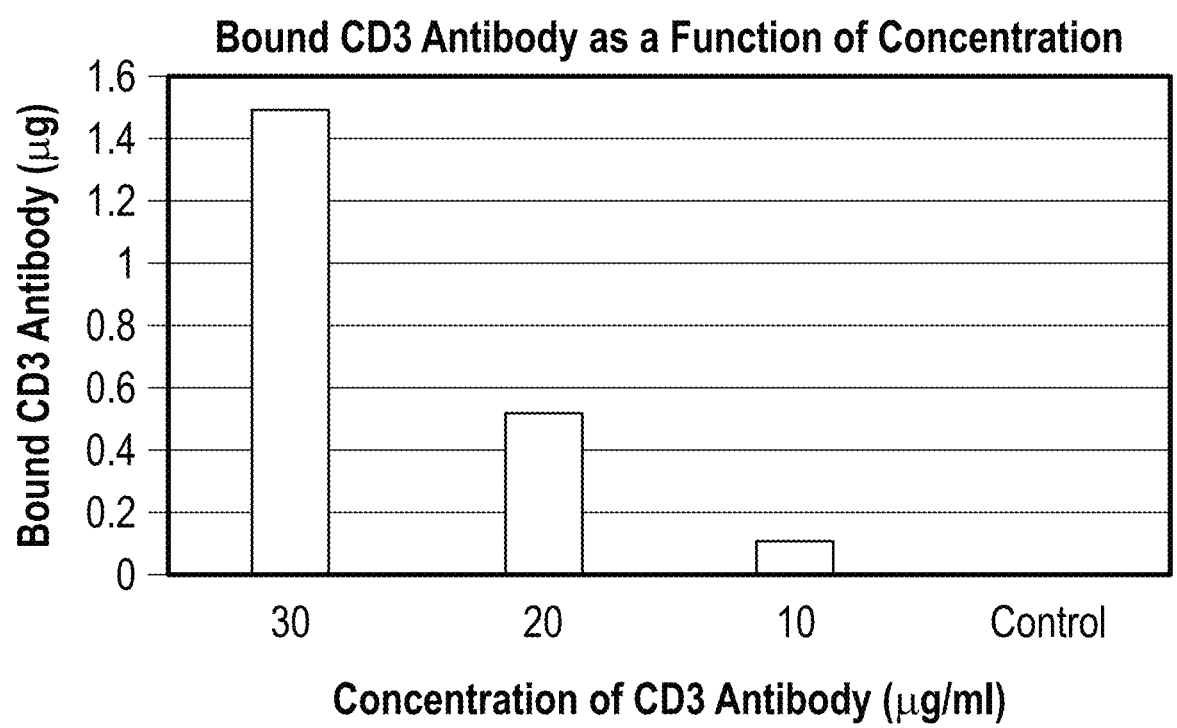
FIG. 6 is a graph that shows that 30 µg/mL resulted in the highest areal concentration of bound antibodies (1.5 µg/cm² on the test coupon surface).

FIG. 6 shows that 30 µg/mL resulted in the highest areal concentration of bound antibodies (1.5 µg/cm² on the test coupon surface). By contrast, the antibody coating areal density on the Miltenyi Biotec's MACSiBead surfaces is typically 0.78 µg/cm² using the same 30 µg/mL antibody concentration. Therefore, about twice the antibody coating density on the surface was achieved as compared to the beads. A higher CD3 antibody surface density is expected to increase, e.g., T cell binding (and activation) efficiency. The experiments indicate that a direct-antibody coating method has been developed for NHS ester-parylene coated surfaces of the devices herein.

Bioconjugation of Antibodies to Ammonia/Ethylene Activated Surface

Two plasma methods were used to generate amine groups on the test disks coated by parylene C. One used only ammonia gas, the other used the combination of ammonia and ethylene gases as referred to in the literature referenced above.

For a quantitative comparison of the number of —$NH_2$ groups grafted onto the test disks after different plasma treatments, two quantification methods were developed. The first method used Coomassie Brilliant Blue (Sigma-CBB dyes) to quantify the —$NH_2$ density on the coated surface. As each molecule of CBB dye can only bind one of the —$NH_2$ groups on the surface, the areal density of —$NH_2$ molecules can be estimated by the solution depletion of CBB dye. A second method used NHS ester-fluorescein (a green fluorescence dye) to bind with the —$NH_2$ groups on the coated surface to form stable amide bonds. The green fluorescence intensity on the surface measured by microscopy is proportional to the areal density of —$NH_2$ molecules on the coated surface.

The data show that the plasma treatment with ammonia alone resulted a higher number of —$NH_2$ groups on the surface. The inclusion of ethylene gas did not increase the areal density of surface —$NH_2$ groups. The average areal density of —$NH_2$ groups on the test disks was estimated around $1.2 \times 10^{15}$ —$NH_2/cm^2$. This —$NH_2$ areal density can bind more than enough antibodies for T cell purification (and subsequent activation). For example, one —$NH_2$ group can bind one NHS ester-biotin, and subsequently one NeutrAvidin, and then three biotinylated antibodies. According to one study, the needed CD3 antibody areal density for CD3+ T cell purification (and activation) is only about $4 \times 10^{10}$ to $1.4 \times 10^{12}/cm^2$. Therefore, the $1.2 \times 10^{15}$ —$NH_2/cm^2$ density produced by the ammonia plasma will provide enough binding sites for immobilized antibodies to interact with the CD3+ T cells.

The data from fluorescence intensities of the coated surfaces were consistent with the data noted above. Both assays demonstrated that the ammonia-only plasma at 80 to 10 W and 0.2 mbar of pressure can produce the highest density of —$NH_2$ groups on the test disk surface.

PDA Priming And m-PEG Coating To Minimize Non-Specific Cell Attachment

Using PDA as the priming coating, different concentrations and lengths of $NH_2$-mPEG for effectiveness in reducing non-specific binding of the mixed cell population in peripheral blood mononuclear cells (PBMCs) to the fixed-bed surface were tested. This study also used the same test disks (1 $cm^2$ surface area) as above as the test samples to simulate the fixed-bed surface. The coupons were pre-coated with PDA using a 2 mg/ml of dopamine hydrochloride (Sigma) solution in Tris buffer at pH=8.5, incubated at 30° C. overnight. After PDA coating $NH_2$-mPEG (Biochempeg) with different concentrations and lengths as listed in Table 1 were incubated with the disks at 50° C. for 3 hours. BPMCs ($6 \times 10^5$ cells/$cm^2$), suspended in about 120 µL of PBS, were incubated on the test disks (triplicate measurement) for 20 minutes at 4° C. Then the disks were immersed into a 50-mL vial containing about 10 mL of PBS. The test disks, held by a pair of tweezers, were moved left-and-right, up-and-down to shake off non-attached cells. The cells collected from three disks in the 50-mL vial (each group) were centrifuged and counted for the non-attached cells. Then the residual cells on the coupons were then estimated by staining with Calcein AM dye and then observed with green fluorescence imaging.

TABLE 1

Comparison Of Different Concentrations Of mPEG Coating On PDA-Precoated Test Disks

| Test Group # | Description Of Coating |
|---|---|
| A | 10 mg/mL of $NH_2$-mPEG5000 |
| B | 20 mg/mL of $NH_2$-mPEG5000 |
| C | 30 mg/mL of $NH_2$-mPEG5000 |
| D | 5 mg/mL of $NH_2$-mPEG2000 + 15 mg/mL $NH_2$-mPEG5000 |
| E | Polylysine (Negative Control) |
| F | Non-adherent well (Positive Control |

Figure 7:
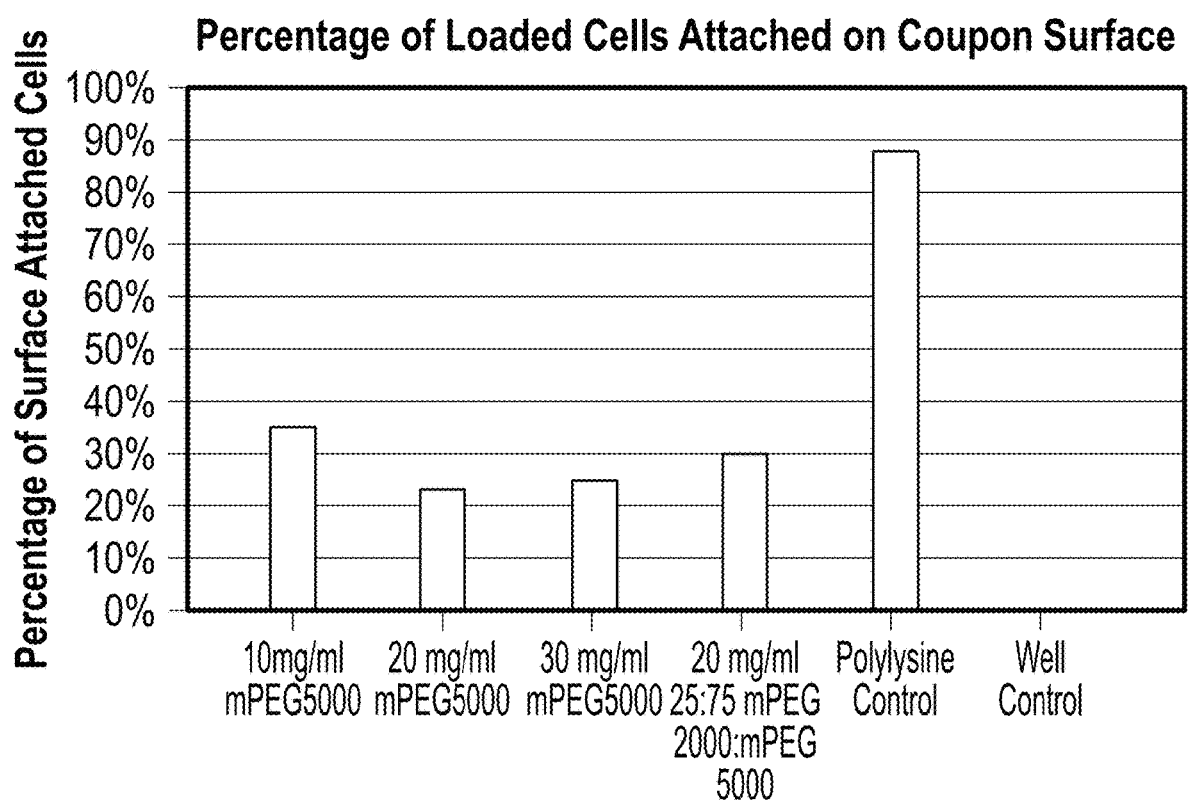
FIG. 7 illustrates the percent of PBMCs non-specifically attached on PDA pre-coated test disks.
Figure 8:
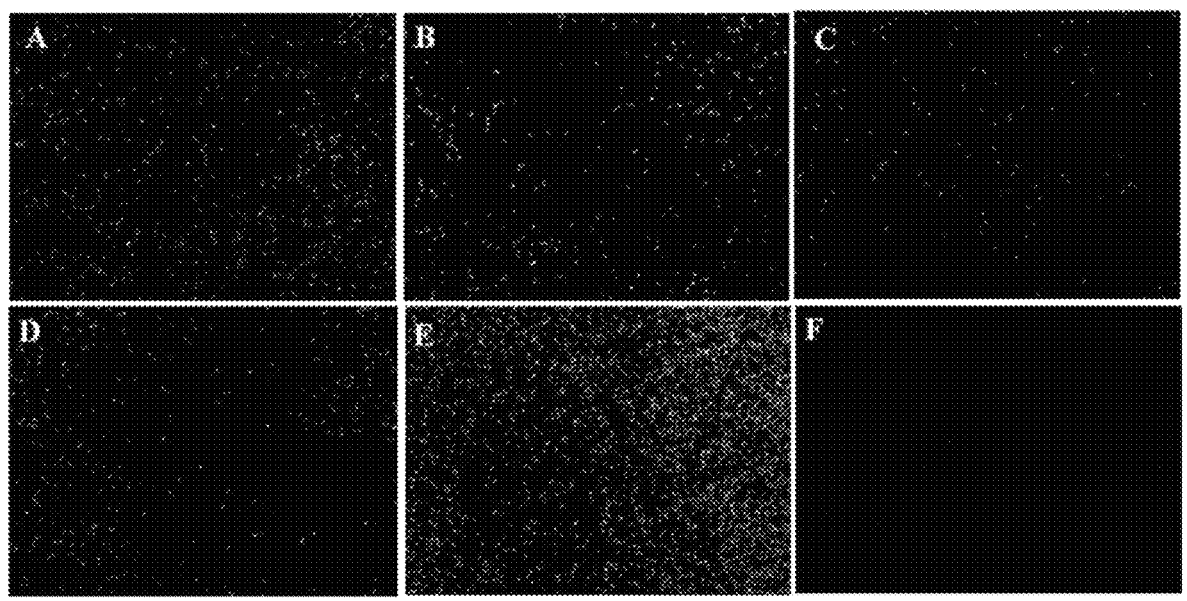
FIG. 8 provides green fluorescent images A, B, C, D, E and F, of PBMCs non-specifically attached on PDA-mPEG coated test disks.

The results are illustrated in FIGS. 7 and 8, respectively. The data indicate that a layer of dopamine-mPEG 5000 at the concentration between 20-30 mg/mL can reduce the non-specific cell attachment by 80%. More specifically, FIG. 7 illustrates the percent of PBMCs non-specifically attached on PDA pre-coated test disks with 10 mg/ml, 20 mg/ml, and 30 mg/ml of $NH_2$-mPEG 5000, and 20 mg/ml of 25:75 ratio of $NH_2$-mPEG 2000:$NH_2$-mPEG 5000 second-layer coating. The controls include test disks that were coated with 0.01% poly-lysine and a non-adherent culture well. FIG. 8 provides green fluorescent images of PBMCs non-specifically attached on PDA-mPEG coated test disks after reaction with (A) 10 mg/ml, (B) 20 mg/ml, and (C) 30 mg/ml of $NH_2$-mPEG 5000, and (D) 20 mg/ml of 25:75 ratio of $NH_2$-mPEG 2000: $NH_2$-mPEG 5000. The controls include (E) test disks that were reacted with 0.01% poly-lysine and (F) a non-adherent culture well.

PDA Priming Followed with PLL-g-mPEG or PEI-mPEG Coating and II-Casein Coating to Prevent Non-Specific Cell Attachment Besides $NH_2$-mPEG, other coatings, including PDA coating subsequently coated with PLL(poly 1-lactide)-g (graft)-PEG 2000, or PEI (polyethylene imine)-PEG coating, were compared with β-casein coating as listed in Table 2. To apply the PLL-g-mPEG coating, the PDA-pre-coated test disks were incubated with 0.1 mg/mL of PLL-g-PEG 2000 (Susos, Switzerland) in Tris buffer (pH=8.5) overnight at 50° C. To apply PEI-mPEG, PDA-pre-coated test disks were incubated in a mixture of 0.25 mg/mL of dopamine and 1 mg/mL of PEI-PEG 2000 (Biochempeg) for 2 hours at room temperature. The β-casein coating was applied on the test disks by incubating the test disks in 1 mg/mL of β-casein (Sigma) for one hour at room temperature under light shaking.

TABLE 2

Comparison Of Different Coatings On Test Disks

| Test Group # | Description Of Coating |
|---|---|
| A | 30 mg/mL with $NH_2$-mPEG 2000:$NH_2$-mPEG = 25:75 |
| B | Pre-coated 0.25 mg/mL PDA + 0.1 mg/mL of PLL-mPEG 2000 |
| C | Pre-coated 0.25 mg/mL PDA + 1 mg/mL PEI-PEG 2000 |
| D | 1 mg/mL of β-Casein |
| E | Non-coated (Control) |
| F | Non-adherent well (Positive Control) |

Figure 9:
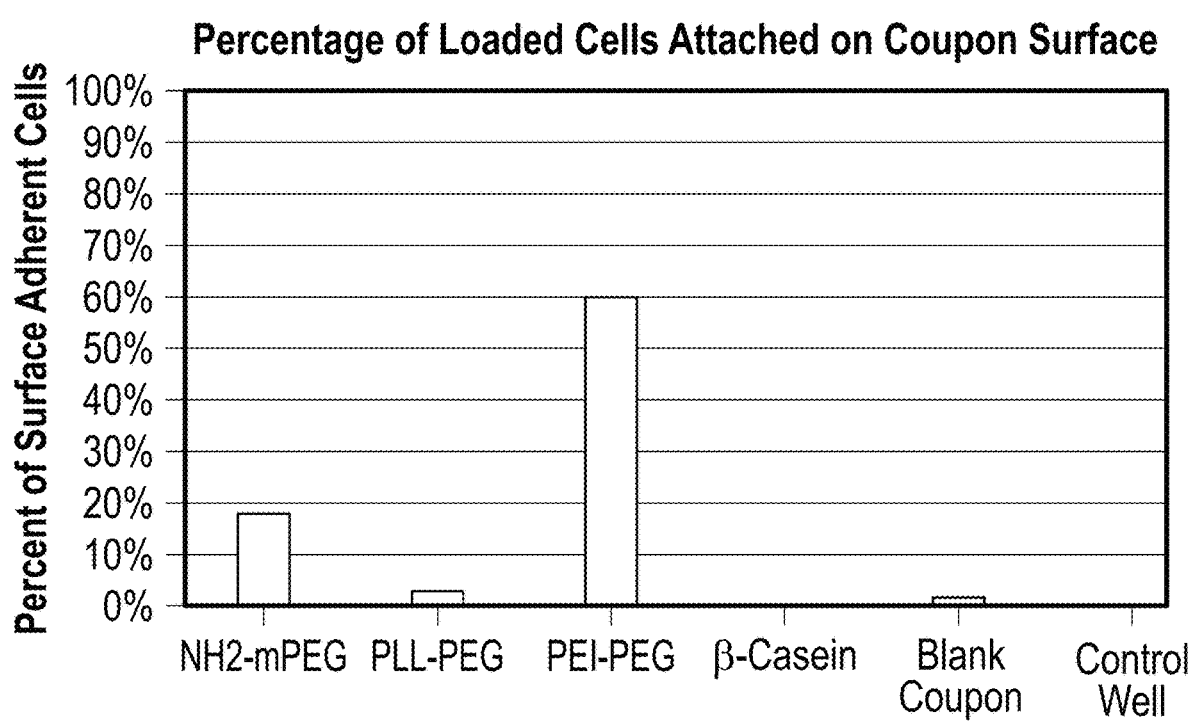
FIG. 9 shows percent of PBMCs non-specifically attached on test disks with different coatings.
Figure 10A:
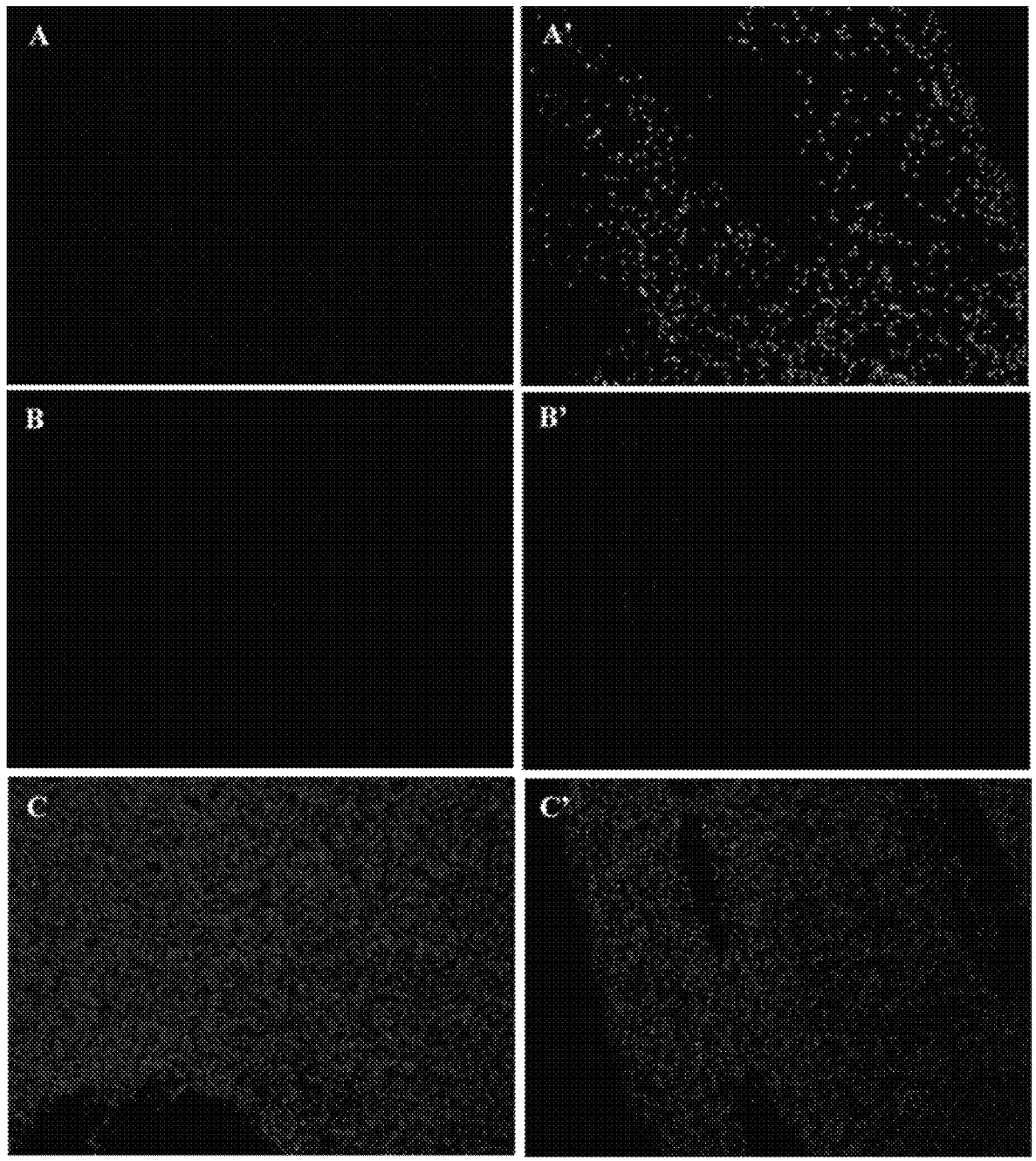
FIGS. 10A and 10B provide a sequence of fluorescent images of the test group # in Table 2, at the center (left column images A, B, C, D, E and F) and edge (right hand column images A', B', C', D', E' and F') of the test disks.
Figure 10B:
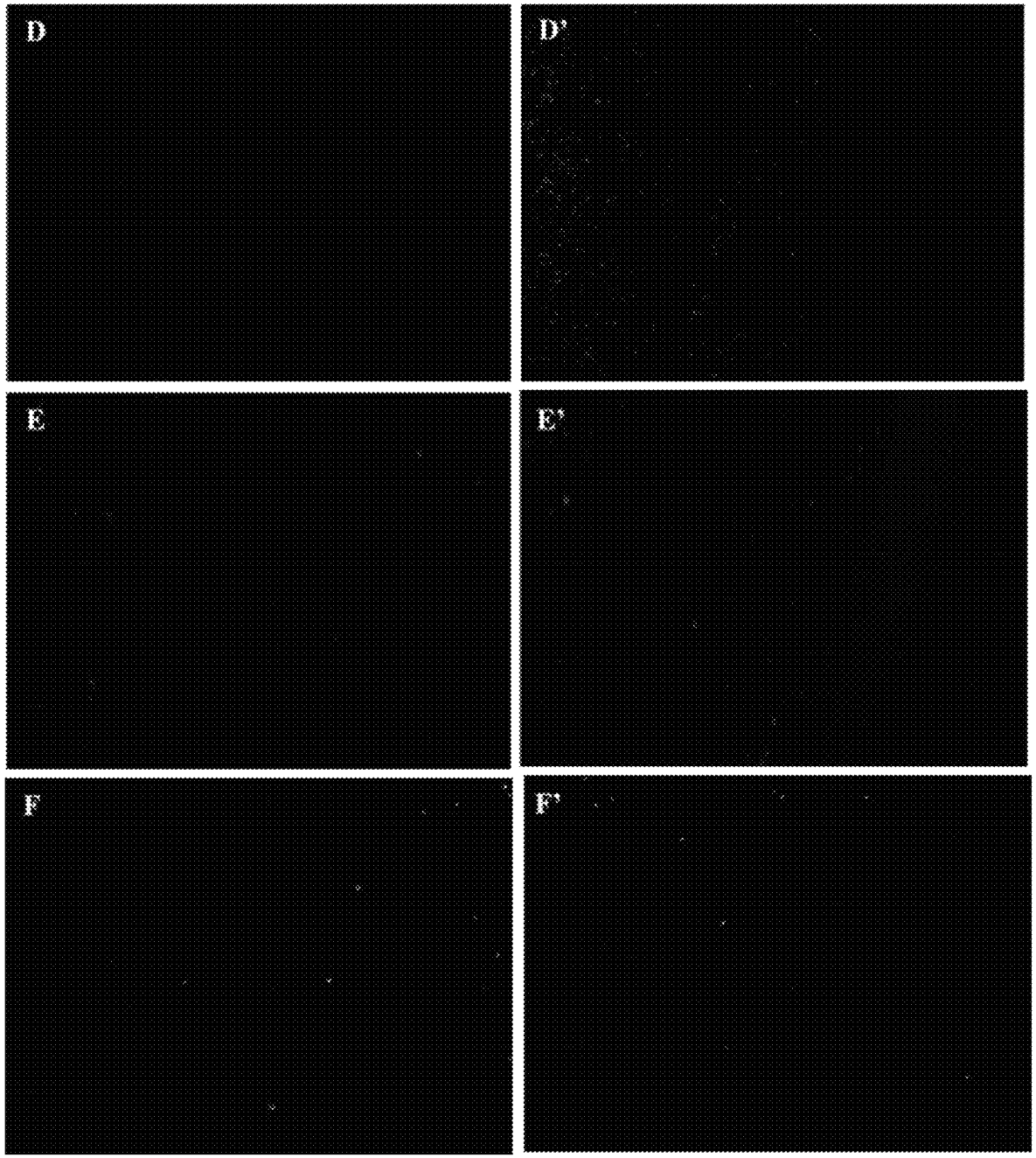

Similar to the above example, BPMCs ($6 \times 10^5$ cells/$cm^2$), suspended in 120 µL of PBS, were then incubated with the above test disks (triplicate measurement) for 20 minutes at 4° C. Non-attached cells were removed from the surface by pipetting and then added to a 50-ml Vial containing about 10 mL of PBS. The test disks were washed three-times via pipetting fresh PBS onto the test disks. After that, the test disks were held by a pair of tweezers and immersed into a 50-mL vial, moved left-and-right, up-and-down to further shake off non-attached cells. The total collected cells from three test disks in each 50-mL vial were centrifuged and the non-attached cells counted. BPMCs remaining on the test disks were stained with Calcein AM dye and imaged with green fluorescence imaging. The results are shown in FIGS. 9, 10A and 10B. Specifically, FIG. 9 shows percent of PBMCs non-specifically attached on test disks with different coatings as described in Table 2: $NH_2$-mPEG, PLL-PEG, PEI-PEG, β-Casein. The controls include non-coated coupons and a non-adherent culture well. From FIG. 9, PDA-PLL-PEG, β-Casein coated test disks, non-coated blank disks (no PDA primary coating and other coatings except for the base parylene c coating), and Corning□ ultra-low attachment control well show low cell attachment. β-Casein coated test disks also show fewer non-specific cell attachments In this experiment, fluorescence images were taken at the center of the coupons (FIGS. 10A and B, left column) and near edge of the test disks (FIGS. 10A and B, right column), respectively. The center of the test received more fluid shear during washing with pipetting. The data also show that the test disks coated with PDA-PLL-PEG or β-Casein achieved minimal non-specific cell attachment.

β-Casein Conjugated with Nth-PEG-biotin/NeutrAvidin for Specific and Non-Specific Binding of Immortalized Jurket Cells In this experiment, six test disks (1 cm² area) were first coated with 1 mg/mL of β-casein. Then the β-casein-coated test disks were coated again with $NH_2$-PEG5000-biotin (Biochempeg). The coating was carried out through a reactive carbodiimide (EDC) and Sulfo-NHS as a catalyst using a two-step coupling protocol. In step one, the β-casein coated coupon surface was first incubated in 0.1 M of MES buffer (pH=4.7) containing 0.1 M of EDC and 5 mM Sulfo-NHS for 15 minutes at room temperature. This step activates the carboxylic acid groups in β-casein. After activation, the EDC/Sulfo-NHS/MES solution on the coated test disks was removed. In step 2, the coated disk surface was incubated with 20 mg/mL of $NH_2$-PEG5000-biotin in PBS (pH 7.4) for 2 hours at room temperature. After reaction, the test disks were washed thoroughly with PBS with 0.05% of Tween 20.

Six test disks immobilized with $NH_2$-PEG5000-biotin via β-casein are further coated with 0.2 mg/mL of NeutrAvidin for 2 hours at 4° C. through the NeutrAvidin-biotin binding. After NeutrAvidin coating the test disks are ready to capture additional biotinylated molecules as additional binding sites on NeutrAvidin are available. The test disks were divided into two groups for the specific and non-specific binding study.

Jurkat cell clone E6-1, an immortalized CD3+ T-cell cell line, was used in this experiment. Jurkat cells were divided in two groups. The Jurkat cells in the first group were labeled with 10 μg/mL of biotinylated anti-CD3 for 10 minutes at 4° C. This group was used in the specific-binding experiment. The Jurkat cells in the second group had no antibody labeling. This group was referred to as the non-specific binding experiment.

Figure 11:
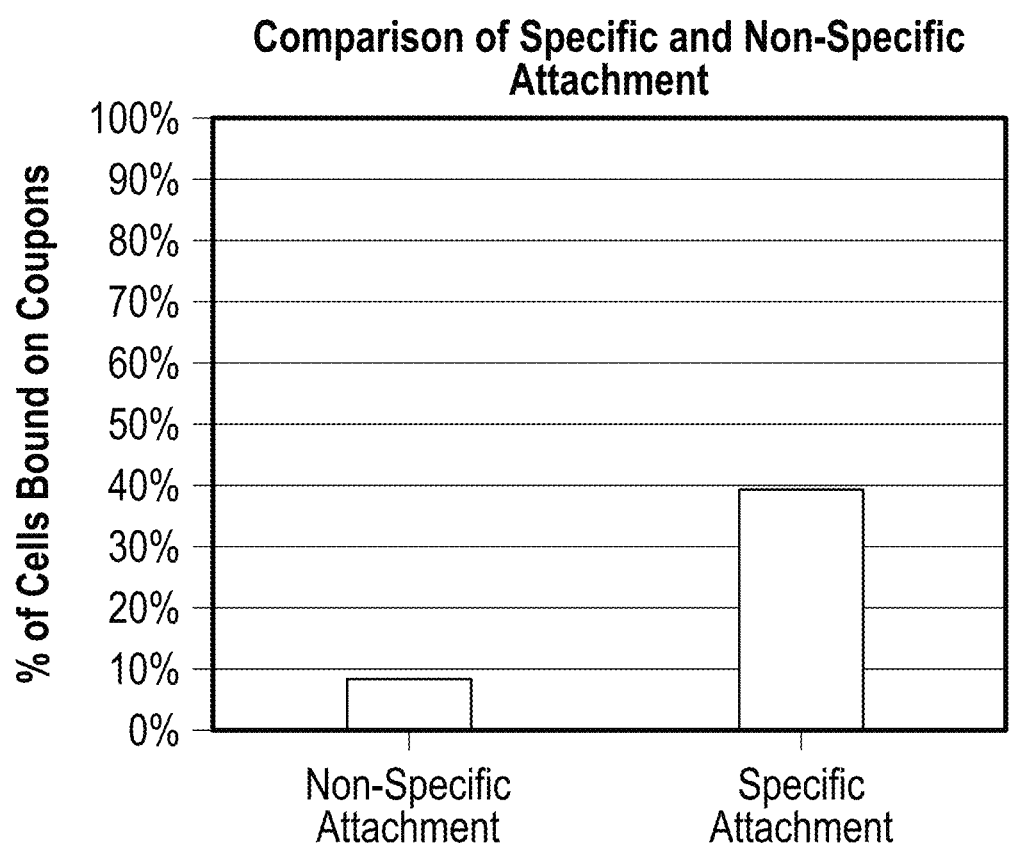
FIG. 11 shows the percentage of Jurkat cells remaining on the coupons in non-specific and specific binding cases.
Figure 12:
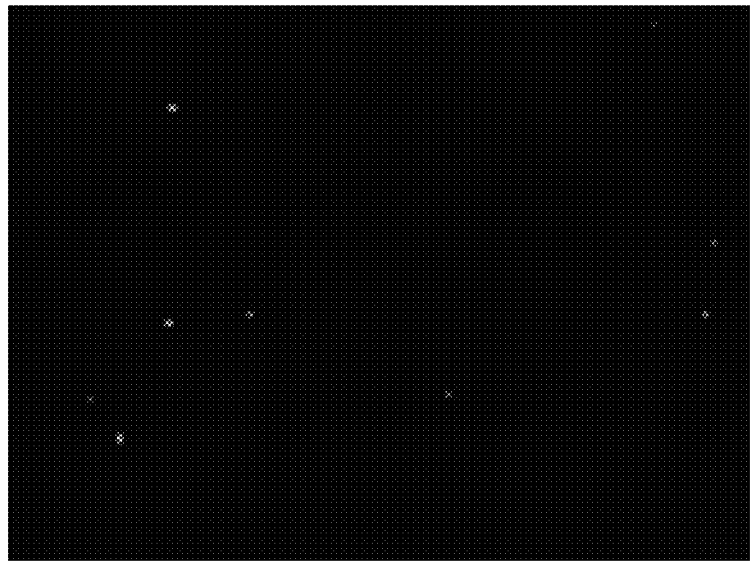
FIG. 12 shows the fluorescent microscopic image of the cells in FIG. 11 due to non-specific attachment.
Figure 13:
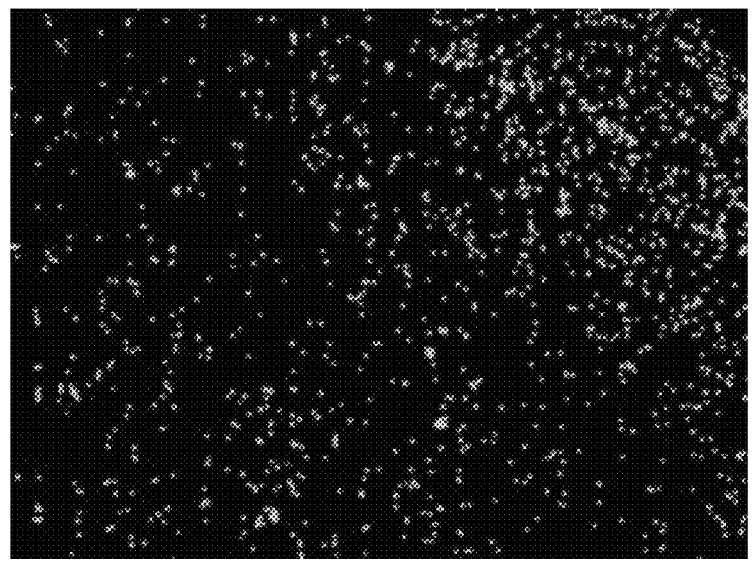
FIG. 13 shows the fluorescent microscopic image of the cells in FIG. 11 due to specific attachment.

Two groups of Jurkat cells were seeded on the two groups of coupons, respectively. Each group includes three test disks. Each test disk was seeded with about 4×10⁵ Jurkat cells. The cells were incubated on the coupon surface for 15 minutes at 4° C. After incubation, three test disks in each group were washed carefully inside a 50 mL falcon tube filled with about 25 mL of cold buffer. The cells washed off from the disks were collected inside the 50-mL falcon tube and counted. The percentage of Jurkat cells remaining on the coupons in non-specific and specific binding cases were calculated as shown in FIG. 11. The cells remaining on the coupons were stained with Calcein green and imaged with fluorescent microscope as shown in FIG. 12 and FIG. 13. The result indicates 1) about 8.5% of Jurkat cells not tagged with antibody remained on the coupons due to non-specific attachment (FIG. 12); 2) about 39.2% of the Jurkat cell tagged with anti-CD3 antibody remained on the coupons (FIG. 13), most likely due to specific attachment.

Figure 14:
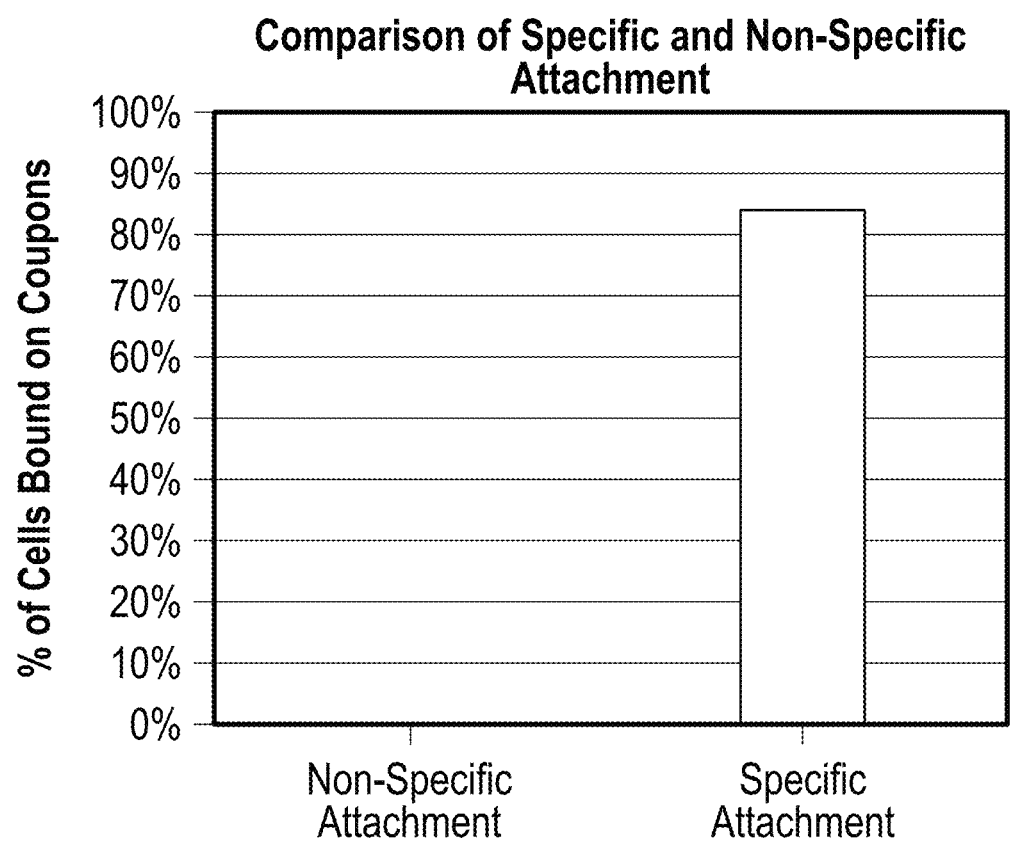
FIG. 14 shows the percentage of Jurkat cells remaining on the coupons in non-specific and specific binding cases.
Figure 15:
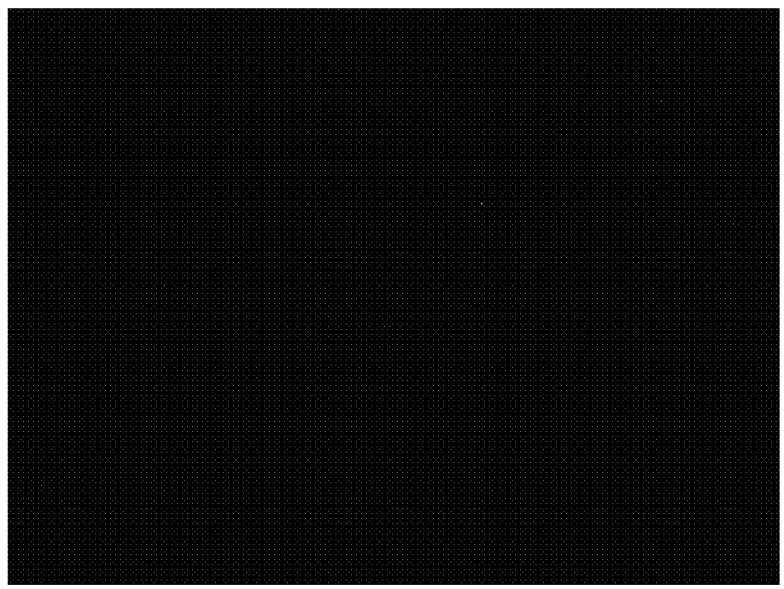
FIG. 15 shows the fluorescent image Jurkat cells remaining on the coupons due to non-specific binding, where almost no cells attach to the disks.
Figure 16:
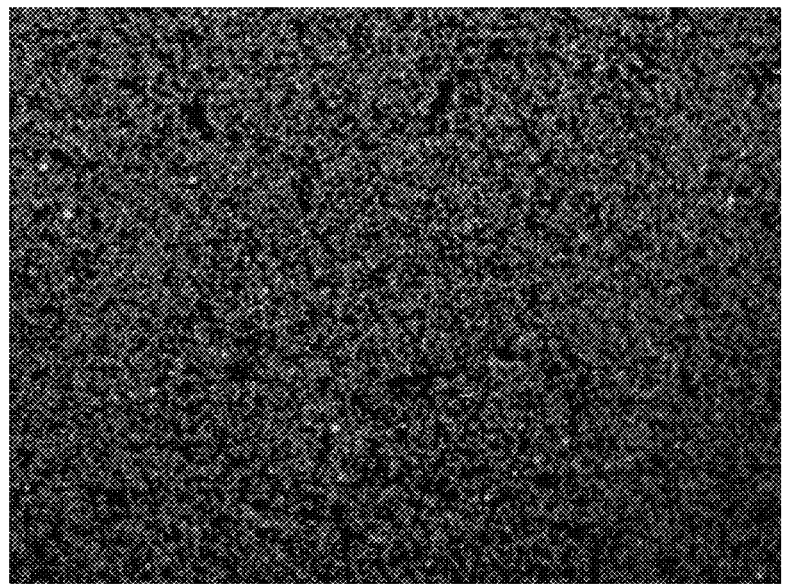
FIG. 16 shows the fluorescent image of Jurkat cells remaining on the coupons due to specific binding.

To optimize the process, we changed different parameters in the process. For example, we 1) increased the antibody labeling time from 10 minutes to 20 minutes; 2) extended the cell incubation time on the coupons from 15 minutes to 30 minutes; 3) used both anti-CD3 and anti-CD28 antibodies to label the Jurkat cells instead of anti-CD3 antibody alone; and 4) changed biotin-PEG linker from biotin-PEG5000-$NH_2$ to biotin-$PEG_{23}$-$NH_2$. As shown in FIGS. 14, 15 and 16, the new experiment yielded significantly better results. The percentage of Jurkat cells remained on the coupons in non-specific and specific binding cases were calculated as shown in FIG. 14. The fluorescence images in FIGS. 15 and 16 indicate almost no cells non-specifically attach to the disks (FIG. 15). In contrast, the disk (FIG. 16) was almost fully packed with the antibody labeled Jurkat cells because of specific binding.

What is claimed is:

1. A method to separate one or more targeted cells from a plurality of cells comprising:
    (a) supplying a device comprising biocompatible polymer material having a plurality of voids having a diameter D and a plurality of pore openings between said voids having a diameter d, including a surface area for cell separation, wherein 90% or more of said voids have a selected void volume (V) that does not vary by more than +/−10.0% and 90% or more of said pore openings between said voids have a value of d that does not vary by more than +/−10.0%;
    (b) providing a surface coating on said voids wherein said surface coating provides for cell binding;
    (c) passing a plurality of cells in a fluid through said device to provide a fluid output; and
        (1) capturing one or more selected cells from said plurality of cells on the coated surface of said device; or
        (2) capturing the one or more selected cells from the plurality of cells in said fluid output.

2. The method of claim 1 wherein said void diameter D has a value in the range of 0.09 mm to 100 mm.

3. The method of claim 1 wherein said void diameter D has a value in the range of 0.2 mm to 50.0 mm.

4. The method of claim 1 wherein said void diameter D has a value in the range of 0.4 mm to 25.0 mm.

5. The method of claim 1 wherein said pore opening diameter d has a value in the range of 0.01 mm to 10.0 mm.

6. The method of claim 1 wherein said pore opening diameter d has a value in the range of 0.05 mm to 2.0 mm.

7. The method of claim 1 wherein said pore opening diameter d has a value in the range of 0.1 mm to 2.0 mm.

8. The method of claim 1 wherein said device captures greater than 50% of said one or more selected cells from said plurality of cells on the coated surface of said device.

9. The method of claim 1 wherein said device captures greater than 50% of said one or more selected cells from said plurality of cells in said fluid output.

10. The method of claim 1 wherein said coating comprises substituted or unsubstituted poly(p-xylylene), β-casein or polydopamine.

* * * * *